(12) United States Patent
Park et al.

(10) Patent No.: US 10,536,206 B2
(45) Date of Patent: Jan. 14, 2020

(54) METHOD FOR TRANSMITTING AND RECEIVING CHANNEL STATE INFORMATION IN WIRELESS COMMUNICATION SYSTEM AND APPARATUS THEREFOR

(71) Applicant: LG ELECTRONICS INC., Seoul (KR)

(72) Inventors: Haewook Park, Seoul (KR); Jonghyun Park, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 9 days.

(21) Appl. No.: 16/063,226

(22) PCT Filed: Dec. 16, 2016

(86) PCT No.: PCT/KR2016/014798
§ 371 (c)(1),
(2) Date: Jun. 15, 2018

(87) PCT Pub. No.: WO2017/105129
PCT Pub. Date: Jun. 22, 2017

(65) Prior Publication Data
US 2018/0375561 A1  Dec. 27, 2018

Related U.S. Application Data

(60) Provisional application No. 62/269,091, filed on Dec. 17, 2015.

(51) Int. Cl.
*H04B 7/06* (2006.01)
*H04B 7/0456* (2017.01)
(Continued)

(52) U.S. Cl.
CPC ......... *H04B 7/0626* (2013.01); *H04B 7/0456* (2013.01); *H04B 7/0469* (2013.01);
(Continued)

(58) Field of Classification Search
CPC ...... H04B 7/0626; H04B 7/0469; H04B 7/10; H04B 7/0456; H04B 7/0617; H04L 5/0094; H04L 5/005; H04L 5/0048
See application file for complete search history.

(56) References Cited

U.S. PATENT DOCUMENTS

2014/0056156 A1  2/2014  Jongren
2014/0286182 A1  9/2014  Chen et al.
(Continued)

OTHER PUBLICATIONS

PCT International Application No. PCT/KR2016/014798, Written Opinion of the International Searching Authority dated Mar. 30, 2017, 10 pages.
(Continued)

*Primary Examiner* — Walli Z Butt
(74) *Attorney, Agent, or Firm* — Lee, Hong, Degerman, Kang & Waimey PC

(57) ABSTRACT

According to one aspect of the present invention, a method for reporting channel state information (CSI) of a terminal in a wireless communication system comprises the steps of: receiving, from a base station, channel state information-reference signal (CSI-RS) resource information on a CSI-RS resource to which a CSI-RS is mapped; receiving the CSI-RS transmitted through one or more antenna ports from the base station on the basis of the received CSI-RS resource information; and reporting, to the base station, the CSI generated on the basis of the received CSI-RS.

15 Claims, 19 Drawing Sheets

(51) Int. Cl.
*H04L 5/00* (2006.01)
*H04B 7/10* (2017.01)

(52) U.S. Cl.
CPC ............. *H04B 7/0617* (2013.01); *H04B 7/10* (2013.01); *H04L 5/005* (2013.01); *H04L 5/0048* (2013.01); *H04L 5/0094* (2013.01)

(56) References Cited

U.S. PATENT DOCUMENTS

| | | | |
|---|---|---|---|
| 2015/0201346 A1* | 7/2015 | Wu | H04L 5/001 370/252 |
| 2017/0048037 A1* | 2/2017 | Yen | H04B 7/0695 |
| 2017/0264405 A1* | 9/2017 | Gao | H04B 7/04 |
| 2018/0054290 A1* | 2/2018 | Park | H04L 1/00 |
| 2019/0028913 A1* | 1/2019 | Park | H04B 17/24 |
| 2019/0215044 A1* | 7/2019 | Noh | H04L 1/06 |

OTHER PUBLICATIONS

Ericsson, "Port numbering for Class A CSI-RS", 3GPP TSG RAN WG1 Meeting #83, R1-157205, Nov. 2015, 7 pages.
CMCC, "Transmission of 16 port non-precoded CSI-RS", 3GPP TSG RAN WG1 Meeting #83, R1-157000, Nov. 2015, 5 pages.
ZTE, "Remaining issues on Non-Precoded CSI-RS", 3GPP TSG RAN WG1 Meeting #83, R1-157482, Nov. 2015, 7 pages.

* cited by examiner (a)

(b)

(a)

(b)

METHOD FOR TRANSMITTING AND RECEIVING CHANNEL STATE INFORMATION IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2016/014798, filed on Dec. 16, 2016, which claims the benefit of U.S. Provisional Application No. 62/269,091, filed on Dec. 17, 2015, the contents of which are all hereby incorporated by reference herein in their entirety.

TECHNICAL FIELD

The present invention relates to a wireless communication system, and more particularly, to a method for transmitting and receiving channel state information and a device for supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed service, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

An object of the present invention is to provide a method for transmitting and receiving channel state information (CSI).

Furthermore, an object of the present invention is to provide a method of efficiently numbering antenna ports through which a CSI-RS is transmitted.

The objects of the present invention are not limited to the technical objects described above, and other technical that are objects not mentioned herein may be understood to those skilled in the art from the description below.

Technical Solution

In one aspect of the present invention, a method for reporting channel state information (CSI) of a UE in a wireless communication system includes: receiving, from a base station, channel state information-reference signal (CSI-RS) resource information on a CSI-RS resource to which a CSI-RS is mapped; receiving the CSI-RS transmitted through one or more antenna ports from the base station based on the received CSI-RS resource information; and reporting, to the base station, the CSI generated based on the received CSI-RS, when the CSR-RS resource is configured by aggregating a plurality of legacy CSI-RS resources, and the aggregated legacy CSI-RS resources are mapped to a plurality of antenna ports having legacy CSI-RS port numbers, wherein the legacy CSI-RS port numbers are one-to-one mapped to final CSI-RS port numbers in units of the aggregated legacy CSI-RS resources, and the legacy CSI-RS port numbers are mapped to the last CSI-RS port numbers in ascending order of the CSI-RS resource numbers allocated for the aggregated legacy CSI-RS resources, and wherein some of the legacy CSI-RS port numbers corresponding to the allocated CSI-RS resource numbers are mapped to a first group in the final antenna port numbers in ascending order, and the remaining legacy CSI-RS port numbers are mapped to a second group in the final port numbers in ascending order.

The first group may correspond to CSI-RS port numbers allocated to antenna ports having first polarization among the final antenna port numbers, and the second group may correspond to CSI-RS port numbers allocated to antenna ports having second polarization different from the first polarization among the final antenna port numbers.

The CSI-RS transmitted through some of the plurality of antenna ports to which the final antenna port numbers are mapped may be measured by a legacy UE.

A case in which the legacy CSI-RS port numbers are mapped to the final antenna port numbers in units of the first and second groups may be limited to cases in which the number of antenna ports to which the aggregated legacy CSI-RS resources are mapped is less than the number of antenna ports in the horizontal direction in the antenna layout of the plurality of antenna ports.

The method for reporting CSI of a UE may further include receiving information about a method of mapping the final antenna port numbers from the base station.

The method for reporting CSI of a UE may further include receiving, from the base station, entire layout information about the plurality of antenna ports and partial layout information about specific antenna ports corresponding to a subset of the plurality of antenna ports.

The specific antenna ports indicated by the partial layout information may be antenna ports to which a CSI-RS measurable by legacy UEs is mapped.

The receiving of the CSI-RS may include dynamically switching the antenna ports through which the CSI-RS is received to the antenna ports indicated by the partial layout information and receiving the CSI-RS through the dynamically switched antenna ports.

The method for reporting CSI of a UE may further include transmitting, to the base station, capability information of the UE indicating whether dynamic switching of the antenna ports through which the CSI-RS is received is available.

The method for reporting CSI of a UE may further include selecting one piece of preferred layout information between the entire layout information and the partial layout information, wherein the reporting of the CSI to the base station comprises generating the CSI based on a CSI-RS transmitted through antenna ports indicated by the selected layout information and reporting the CSI along with the selected layout information to the base station.

The CSI-RS resource may correspond to a non-precoded CSI-RS resource or a plurality of CSI-RS resources of a beamformed CSI-RS type.

In another aspect of the present invention, a UE transmitting channel state information (CSI) in a wireless communication system includes: a radio frequency (RF) unit for transmitting and receiving radio signals; and a processor for controlling the RF unit, wherein the processor is configured to receive, from a base station, CSI-RS resource information on a CSI-RS resource to which a CSI-RS is mapped, to receive the CSI-RS transmitted through one or more antenna ports from the base station based on the received CSI-RS resource information and to report, to the base station, the CSI generated based on the received CSI-RS, when the CSR-RS resource is configured by aggregating a plurality of legacy CSI-RS resources, and the aggregated legacy CSI-RS resources are mapped to a plurality of antenna ports having legacy CSI-RS port numbers, wherein the legacy CSI-RS port numbers are one-to-one mapped to final CSI-RS port numbers in units of the aggregated legacy CSI-RS resources, and the legacy CSI-RS port numbers are mapped to the last CSI-RS port numbers in ascending order of the CSI-RS resource numbers allocated for the aggregated legacy CSI-RS resources, and wherein some of the legacy CSI-RS port numbers corresponding to the allocated CSI-RS resource numbers are mapped to a first group in the final antenna port numbers in ascending order, and the remaining legacy CSI-RS port numbers are mapped to a second group in the final port numbers in ascending order.

The first group may correspond to CSI-RS port numbers allocated to antenna ports having first polarization among the final antenna port numbers, and the second group may correspond to CSI-RS port numbers allocated to antenna ports having second polarization different from the first polarization among the final antenna port numbers.

The CSI-RS transmitted through some of the plurality of antenna ports to which the final antenna port numbers are mapped may be measured by a legacy UE.

A case in which the legacy CSI-RS port numbers are mapped to the final antenna port numbers in units of the first and second groups may be limited to cases in which the number of antenna ports to which the aggregated legacy CSI-RS resources are mapped is less than the number of antenna ports in the horizontal direction in the antenna layout of the plurality of antenna ports.

Advantageous Effects

According to embodiments of the present invention, a UE can easily derive CSI and feed back the CSI to a base station.

In addition, when CSI-RS patterns according to an embodiment of the present invention are used, CSI-RS patterns of the legacy system are reused and thus a new efficient CSI-RS pattern can be derived/used without considerably modifying the legacy system. Further, compatibility between a new system and the legacy system can be maintained.

Furthermore, when the port numbering method according to an embodiment of the present invention is used, next-generation UEs and legacy UEs can share a CSI-RS transmitted from a base station, and thus compatibility between a new system and the legacy system can be maintained.

It will be appreciated by persons skilled in the art that the effects that can be achieved with the present invention are not limited to what has been particularly described hereinabove and other advantages of the present invention will be more clearly understood from the following detailed description.

DESCRIPTION OF DRAWINGS

The accompanying drawings, which are included herein as a part of a description in order to help understanding of the present invention, provide embodiments of the present invention, and describe the technical features of the present invention with the description below.

BEST MODE

Figure 1:
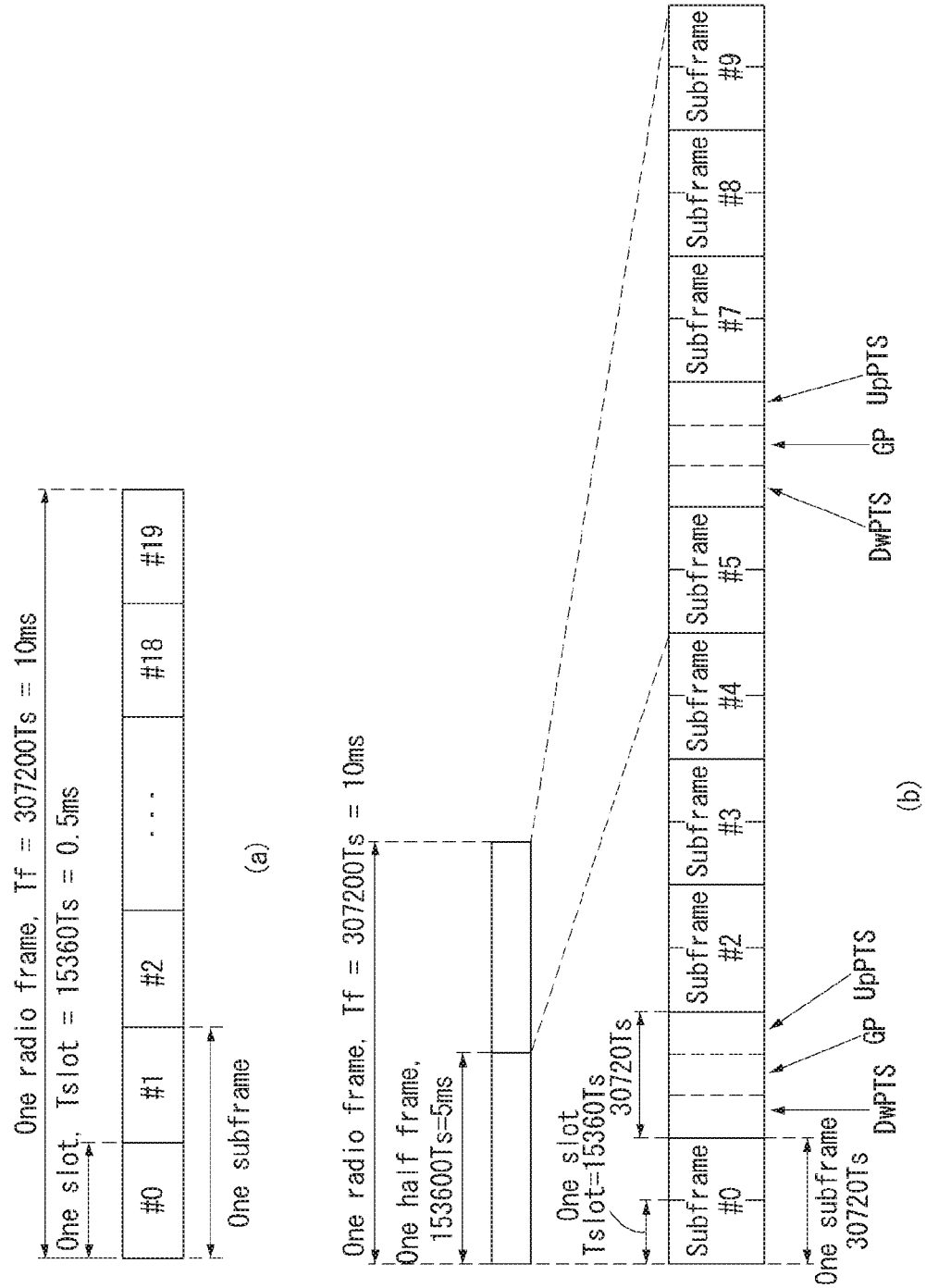
FIG. 1 illustrates the structure of a radio frame in a wireless communication system to which an embodiment of the present invention may be applied.

Some embodiments of the present invention are described in detail with reference to the accompanying drawings. A detailed description to be disclosed along with the accompanying drawings is intended to describe some exemplary embodiments of the present invention and is not intended to describe a sole embodiment of the present invention. The following detailed description includes more details in order to provide full understanding of the present invention. However, those skilled in the art will understand that the present invention may be implemented without such more details.

In some cases, in order to avoid making the concept of the present invention vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the device may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which an Embodiment of the Present Invention May be Applied

FIG. 1 shows the structure of a radio frame in a wireless communication system to which an embodiment of the present invention may be applied.

3GPP LTE/LTE-A support a radio frame structure type 1 which may be applicable to frequency division duplex (FDD) and a radio frame structure which may be applicable to time division duplex (TDD).

In FIG. 1, the size of the radio frame in a time domain is represented as a multiple of a time unit of $T\_s=1/(15000*2048)$. Downlink and uplink transmission includes a radio frame having a period of $T\_f=307200*T\_s=10$ ms.

FIG. 1(a) illustrates the structure of a type 1 radio frame. The type 1 radio frame may be applied to both full duplex and half duplex FDD.

The radio frame includes 10 subframes. One radio frame includes 20 slots of $T\_slot=15360*T\_s=0.5$ ms in length. 0 to 19 indices are assigned to the respective slots. One subframe includes consecutive 2 slots in the time domain, and a subframe i includes a slot 2i and a slot 2i+1. The time taken to send one subframe is called a transmission time period (TTI). For example, the length of one subframe may be 1 ms, and the length of one slot may be 0.5 ms.

In FDD, uplink transmission and downlink transmission are divided in a frequency domain. There is no limit to full duplex FDD, whereas UE cannot send and receive data at the same time in a half duplex FDD operation.

One slot includes a plurality of orthogonal frequency division multiplexing (OFDM) symbols in the time domain and includes a plurality of resource blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of consecutive subcarriers in one slot.

FIG. 1(b) shows a frame structure type 2.

The frame structure type 2 includes two half frames, each having a length of $153600*T\_s=5$ ms. Each half frame includes 5 subframes, each having a length of $30720*T\_s=1$ ms.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |

TABLE 1-continued

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, "D" indicates a subframe for downlink transmission, "U" indicates a subframe for uplink transmission, and "S" indicates a special subframe including three types of fields, including a downlink pilot time slot (DwPTS), a guard period (GP), and an uplink pilot time slot (UpPTS).

The DwPTS is used for initial cell search, synchronization or channel estimation in UE. The UpPTS is used for synchronization of uplink transmission for UE and channel estimation in an eNB. The GP is a period for removing interference generated in uplink due to multi-path delay of a downlink signal between uplink and downlink.

Each subframe i includes a slot 2i and a slot 2i+1, each having T_slot=15360*T_s=0.5 ms length.

An uplink-downlink configuration may be classified into 7 types. The positions and/or number of downlink subframes, special subframes, and uplink subframe are different in each configuration.

Table 2 shows the configuration (the length of a DwPTS/GP/UpPTS) of a special subframe.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The structure of the radio frame according to the example of FIG. 1 is only an example. The number of subcarriers included in a radio frame or the number of slots included in a subframe and the number of OFDM symbols included in a slot may be changed in various ways.

Figure 2:
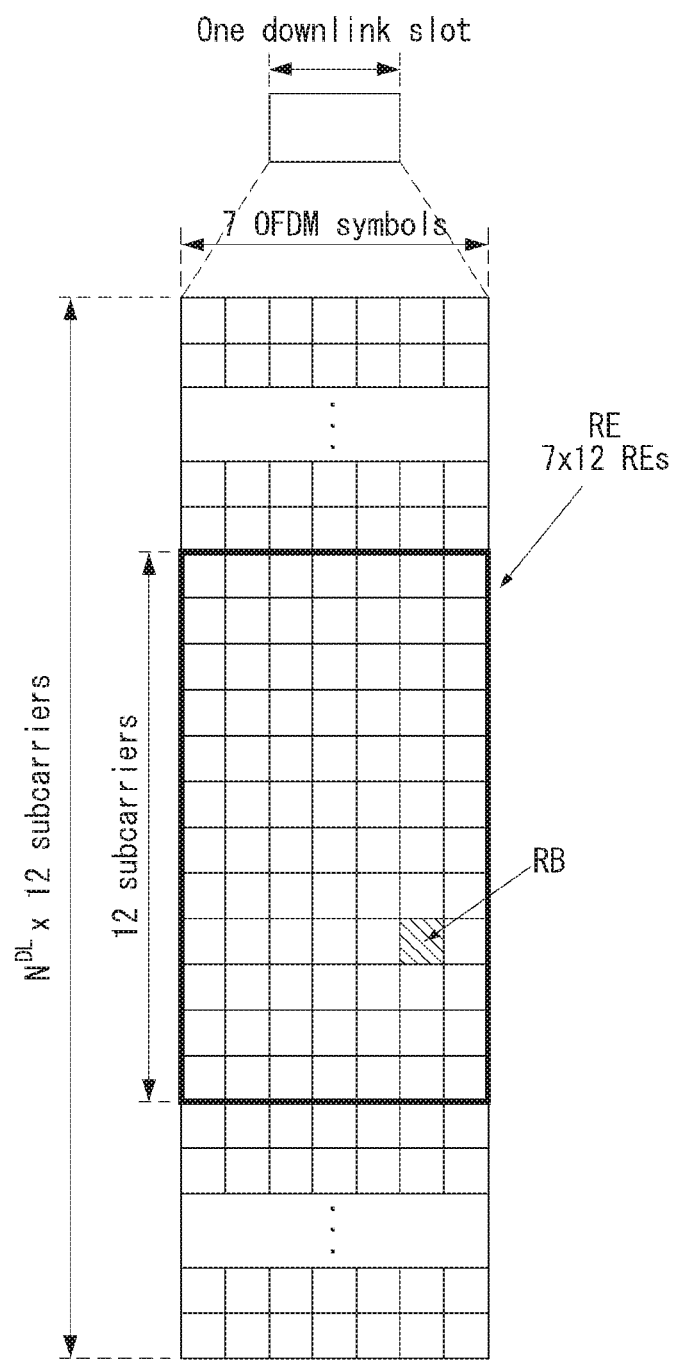
FIG. 2 is a diagram illustrating a resource grid for a downlink slot in a wireless communication system to which an embodiment of the present invention may be applied.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs N^DL included in a downlink slot depends on a downlink transmission bandwidth.

The structure of an uplink slot may be the same as that of a downlink slot.

Figure 3:
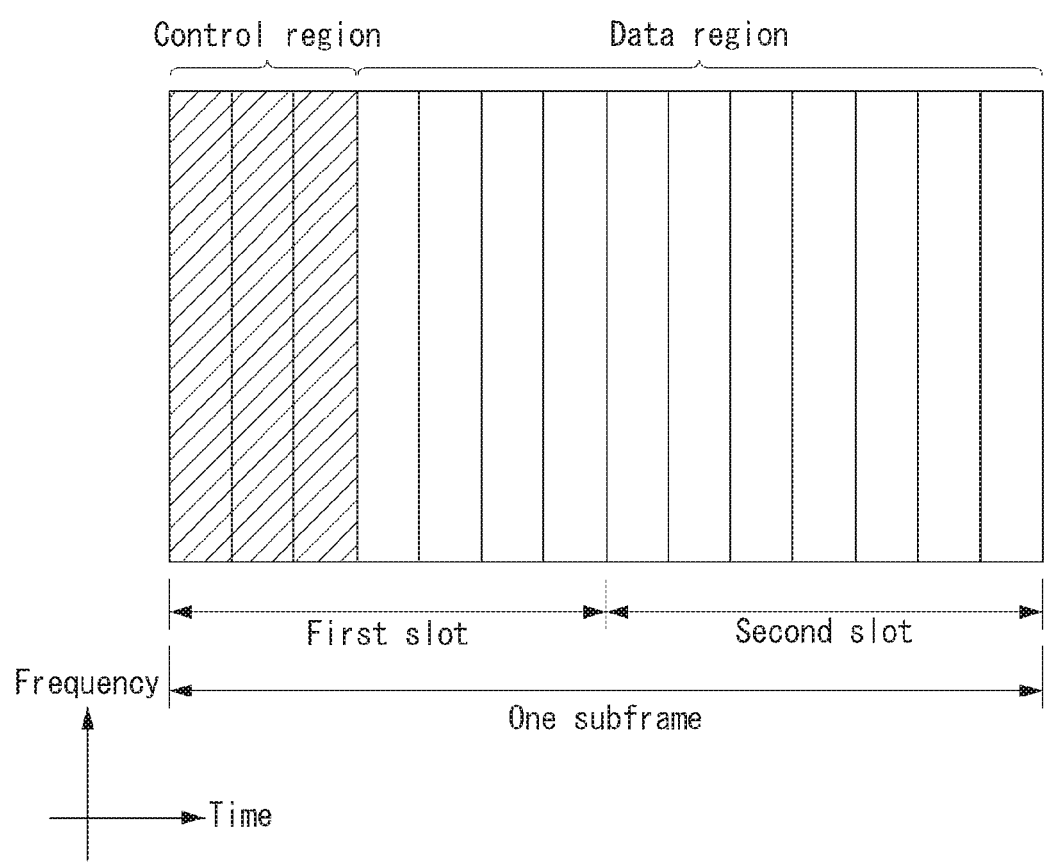
FIG. 3 illustrates the structure of a downlink subframe in a wireless communication system to which an embodiment of the present invention may be applied.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

Figure 4:
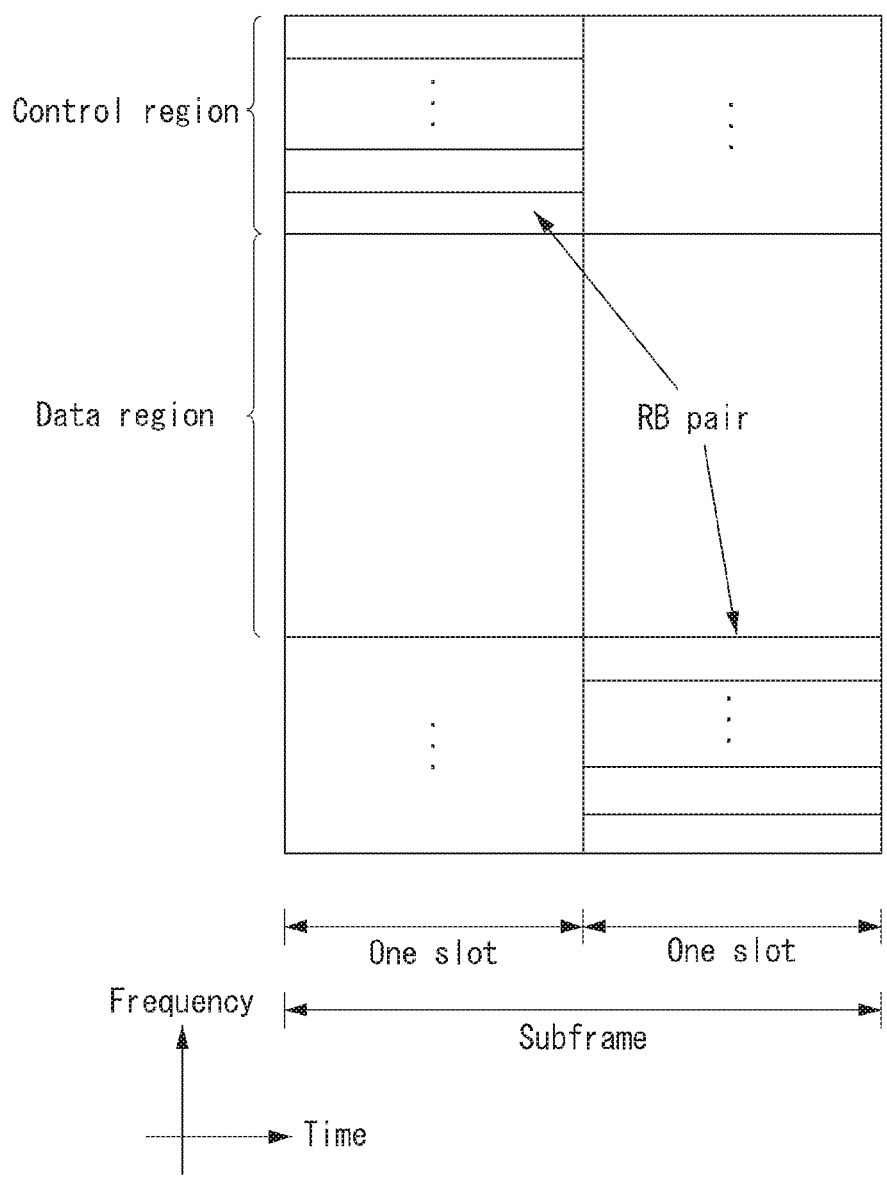
FIG. 4 illustrates the structure of an uplink subframe in a wireless communication system to which an embodiment of the present invention may be applied.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A resource block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna."

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

The multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

Figure 5:
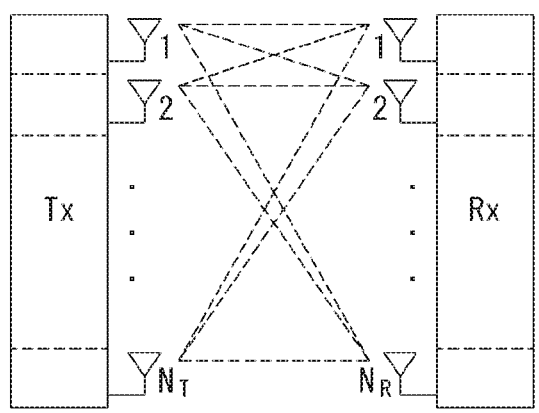
FIG. 5 shows the configuration of a known MIMO communication system.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment $R_i$ by a maximum transfer rate $R_o$ if one antenna is used.

$$R_i = \min(N_T, N_R) \quad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case, may include a maximum likelihood detection (MLD) receiver, a zero-forcing (ZF) receiver, a minimum mean square error (MMSE) receiver, diagonal-bell laboratories layered space-time (D-BLAST), and vertical-bell laboratories layered space-time (V-BLAST). In particular, if a transmission end can be aware of channel information, a singular value decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and N_R reception antennas are present.

First, a transmission signal is described below. If the N_T transmission antennas are present as described above, a maximum number of pieces of information which can be transmitted are N_T, which may be represented using the following vector.

$$s = [s_1, s_2, \Lambda, s_{N_T}]^T \quad \text{[Equation 2]}$$

Transmission power may be different in each of pieces of transmission information s_1, s_2, ..., s_NT. In this case, if pieces of transmission power are P_1, P_2, ..., P_NT, transmission information having controlled transmission power may be represented using the following vector.

$$\hat{s} = [\hat{s}_1, \hat{s}_2, \Lambda, \hat{s}_{N_T}]^T = [P_1 s_1, P_2 s_2, \Lambda, P_{N_T} s_{N_T}]^T \quad \text{[Equation 3]}$$

In Equation 3, transmission information having controlled transmission power may be represented as follows using the diagonal matrix P of transmission power.

$$\hat{s} = \begin{bmatrix} P_1 & & & 0 \\ & P_2 & & \\ & & O & \\ 0 & & & P_{N_T} \end{bmatrix} \begin{bmatrix} s_1 \\ s_2 \\ M \\ s_{N_T} \end{bmatrix} = Ps \quad \text{[Equation 4]}$$

The information vector having controlled transmission power in Equation 4 is multiplied by a weight matrix W, thus forming N_T transmission signals x_1, x_2, . . . , x_NT that are actually transmitted. In this case, the weight matrix functions to properly distribute the transmission information to antennas according to a transport channel condition. The following may be represented using the transmission signals x_1, x_2, . . . , x_NT.

[Equation 5]

$$x = \begin{bmatrix} x_1 \\ x_2 \\ M \\ x_i \\ M \\ x_{N_T} \end{bmatrix} = \begin{bmatrix} w_{11} & w_{12} & \Lambda & w_{1N_T} \\ w_{21} & w_{22} & \Lambda & w_{2N_T} \\ M & & O & M \\ w_{i1} & w_{i2} & \Lambda & w_{iN_T} \\ M & & O & M \\ w_{N_T1} & w_{N_T2} & \Lambda & w_{N_TN_T} \end{bmatrix} \begin{bmatrix} \hat{s}_1 \\ \hat{s}_2 \\ M \\ \hat{s}_j \\ M \\ \hat{s}_{N_T} \end{bmatrix} = W\hat{s} = WPs$$

In Equation 5, w_ij denotes weight between an i-th transmission antenna and a j-th transmission information, and W is an expression of a matrix of the weight. Such a matrix W is called a weight matrix or precoding matrix.

The transmission signal x, such as that described above, may be taken into consideration to be used in the case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, . . . , y_NR of the respective antennas are represented as follows using a vector y.

$$y=[y_1,y_2,\Lambda,y_{N_R}]^T$$ [Equation 6]

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

Figure 6:
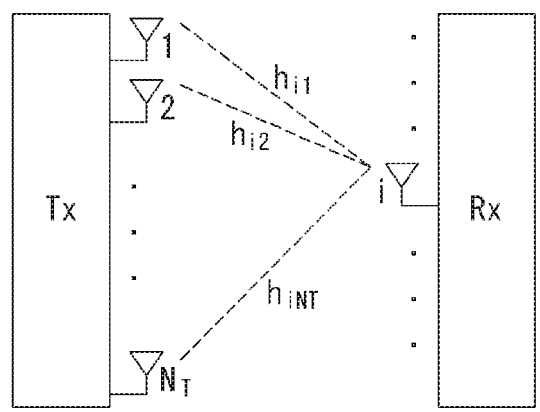
FIG. 6 is a diagram showing a channel from a plurality of transmission antennas to a single reception antenna.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T=[h_{i1},h_{i2},\Lambda,h_{iN_T}]$$ [Equation 7]

Furthermore, if all channels from the N_T transmission antenna to N_R reception antennas are represented through a matrix expression, such as Equation 7, they may be represented as follows.

[Equation 8]

$$H = \begin{bmatrix} h_1^T \\ h_2^T \\ M \\ h_i^T \\ M \\ h_{N_R}^T \end{bmatrix} = \begin{bmatrix} h_{11} & h_{12} & \Lambda & h_{1N_T} \\ h_{21} & h_{22} & \Lambda & h_{2N_T} \\ M & & O & \\ h_{i1} & h_{i2} & \Lambda & h_{iN_T} \\ M & & O & \\ h_{N_R1} & h_{N_R2} & \Lambda & h_{N_RN_T} \end{bmatrix}$$

Additive white Gaussian noise (AWGN) is added to an actual channel after the actual channel experiences the channel matrix H. Accordingly, AWGN n_1, n_2, . . . , n_N_R added to the N_R reception antennas, respectively, are represented using a vector as follows.

$$n=[n_1,n_2,\Lambda,n_{N_R}]^T$$ [Equation 9]

A transmission signal, a reception signal, a channel, and AWGN in a multi-input/output antenna communication system may be represented to have the following relationship through the modeling of the transmission signal, reception signal, channel, and AWGN, such as those described above.

[Equation 10]

$$y = \begin{bmatrix} y_1 \\ y_2 \\ M \\ y_i \\ M \\ y_{N_R} \end{bmatrix} = \begin{bmatrix} h_{11} & h_{12} & \Lambda & h_{1N_T} \\ h_{21} & h_{22} & \Lambda & h_{2N_T} \\ M & & O & \\ h_{i1} & h_{i2} & \Lambda & h_{iN_T} \\ M & & O & \\ h_{N_R1} & h_{N_R2} & \Lambda & h_{N_RN_T} \end{bmatrix} \begin{bmatrix} x_1 \\ x_2 \\ M \\ x_j \\ M \\ x_{N_T} \end{bmatrix} + \begin{bmatrix} n_1 \\ n_2 \\ M \\ n_i \\ M \\ n_{N_R} \end{bmatrix} = Hx + n$$

The number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R)$$ [Equation 11]

Furthermore, if a matrix is subjected to Eigen value decomposition, a rank may be defined as the number of Eigen values that belong to Eigen values and that are not 0. Likewise, if a rank is subjected to singular value decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Reference Signal (RS)

In a wireless communication system, since data is transmitted through a radio channel, a signal may be distorted during transmission. In order for the receiving end to accurately receive the distorted signal, the distortion of the received signal needs to be corrected using channel information. In order to detect the channel information, a signal transmitting method known to both the transmitter side and the receiver side and a method for detecting the channel information using the degree of distortion when the signal is transmitted through the channel are primarily used. The aforementioned signal is referred to as a pilot signal or a reference signal (RS).

Recently, when packets are transmitted in most mobile communication systems, multiple transmission antennas and multiple reception antennas are adopted to increase data transmission/reception efficiency, unlike the related art using a single transmission antenna and a single reception antenna. In transmission and reception of data using multiple input/output antennas, the channel states between transmission antennas and reception antennas should be detected in order to accurately receive signals. Accordingly, each transmission antenna needs to have an individual reference signal.

In a wireless communication system, RSs can be largely classified into two types according to its purpose. The RSs include an RS for channel information acquisition and RSs for data demodulation. The former is used for acquisition of channel information to downlink by a UE. Thus, the former RS needs to be transmitted in a wideband, and even a UE that does not receive downlink data in a specific subframe needs to receive and measure the RS. In addition, this RS is also used for measurement for mobility management (RRM) such as handover. The latter is an RS that is transmitted together with corresponding resource when a base station transmits downlink data. In this regard, the UE can receive the corresponding RS to estimate the channel and accordingly demodulate data. This RS needs to be transmitted in a region in which data is transmitted.

Downlink reference signals include a common RS (CRS) for acquiring information on channel states shared by all terminals within a cell and measuring handover, etc. and a dedicated RS used for data modulation for a specific terminal. Using these reference signals, information for demodulation and channel measurement may be provided. That is, the DRS is used only for data demodulation, while the CRS is used for two purposes including channel information acquisition and data demodulation.

The receiver side (that is, terminal) measures the channel state from the CRS and feeds back the indicators associated with the channel quality, such as the channel quality indicator (CQI), the precoding matrix index (PMI), and/or the rank indicator (RI) to the transmitting side (that is, base station). The CRS is also referred to as a cell-specific RS. On the contrary, a reference signal associated with a feed-back of channel state information (CSI) may be defined as CSI-RS.

The DRS may be transmitted through resource elements when data demodulation on the PDSCH is required. The terminal may receive whether the DRS is present through the upper layer and is valid only when the corresponding PDSCH is mapped. The DRS may be referred to as a UE-specific RS or a demodulation RS (DMRS).

Figure 7:
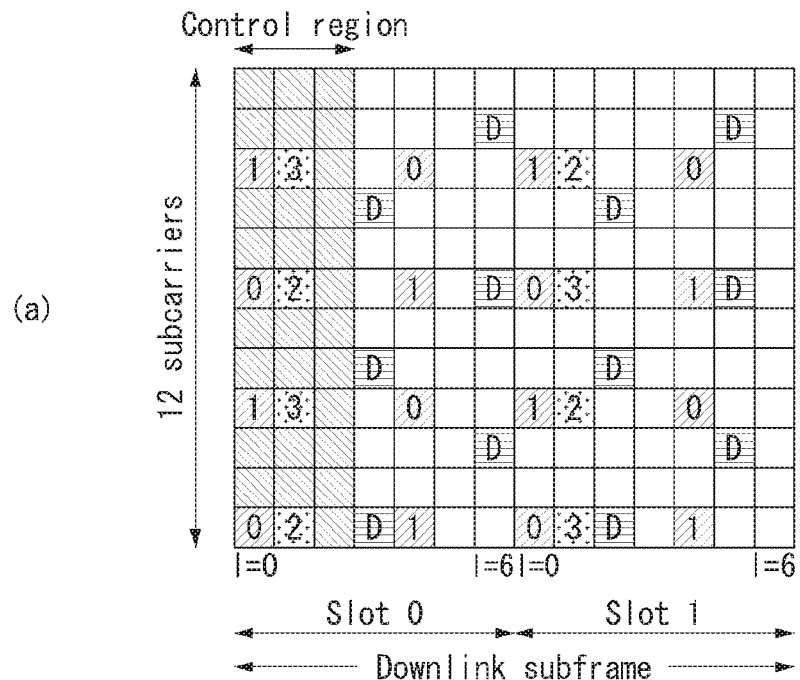
FIG. 7 illustrates a reference signal pattern mapped to a downlink resource block pair in the wireless communication system to which an embodiment of the present invention may be applied.
Figure 7:
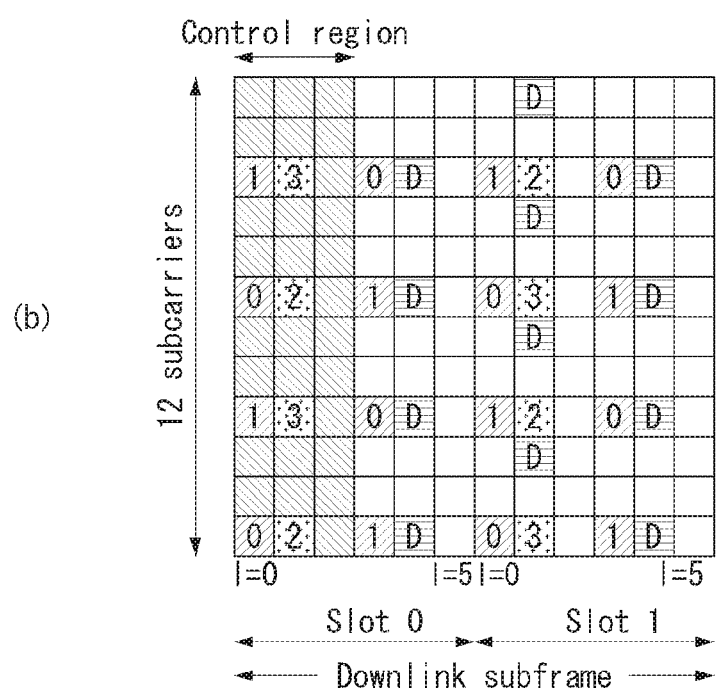

FIG. 7 illustrates a reference signal pattern mapped to a downlink resource block pair in the wireless communication system to which an embodiment of the present invention may be applied.

Referring to FIG. 7, as a unit by which a reference signal is mapped, a downlink resource block pair may be represented by one subframe in the time domain×12 subcarriers in the frequency domain. In other words, one resource block pair on the time axis (x-axis) has a length of 14 OFDM symbols in the case of a normal CP (Cyclic Prefix) (in the case of FIG. 7(a)) and has a length of 12 OFDM symbols in the case of an extended CP (in the case of FIG. 7(b)). In the resource block grids, the resource elements (REs) denoted by '0', '1', '2', and '3' indicate the CRS positions of antennas with indices of '0', '1', '2', and '3', respectively; and the resource elements denoted by 'D' indicate DRS positions.

If the base station uses a single transmission antenna, a reference signal for the single antenna port is arrayed.

When the base station uses two transmission antennas, reference signals for two transmitting antenna ports are arrayed by using a time division multiplexing (TDM) scheme and/or a frequency division multiplexing (FDM) scheme. That is, different time resources and/or different frequency resources are allocated to the reference signals for two antenna ports so as to be distinguished from each other.

Moreover, when the base station uses four transmission antennas, reference signals for four transmitting antenna ports are arrayed using the TDM and/or FDM scheme. Channel information measured by a downlink signal receiving side (i.e., a terminal) may be used to demodulate data transmitted by using a transmission scheme such as single transmitting antenna transmission, transmission diversity, closed-loop spatial multiplexing, open-loop spatial multiplexing, or multi-user MIMO.

In the case where the multi-input/multi-output antenna is supported, when the reference signal is transmitted from a specific antenna port, the reference signal is transmitted to the positions of specific resource elements according to a pattern of the reference signal and not transmitted to the positions of the specific resource elements for another antenna port. That is, reference signals among different antennas are not duplicated with each other.

The LTE-A system, which has evolved from the LTE system, has to be designed to support up to 8 transmission antennas for downlink transmission of the base station. Therefore, an RS for up to 8 transmission antennas also has to be supported. The LTE system only defines a downlink RS for up to four antenna ports. Therefore, if the base station in the LTE-A system uses 4 up to 8 downlink transmission antennas, an RS for these antenna ports has to be additionally defined and designed. The RS for up to 8 transmission antennas has to be designed for both an RS for channel measurement and an RS for data demodulation as described above.

One of important factors to be considered in designing the LTE-A system is backward compatibility; namely, an LTE terminal is required to operate smoothly in the LTE-A system, and the system has to also support the operation. In view of RS transmission, an RS has to be defined additionally for up to 8 transmission antenna ports in the time-frequency region in which a CRS defined in the LTE system is transmitted over the whole frequency band at each subframe. If an RS pattern for up to 8 transmission antennas is added in the LTE-A system over the whole frequency band for each subframe in the same way as the CRS of the existing LTE system, the RS overhead becomes too large.

Therefore, RSs newly designed in the LTE-A system may be classified largely into two types: an RS for channel measurement to select MCS, PMI, etc. (CSI-RS: Channel State Information-RS, Channel State Indication-RS, etc.) and an RS for demodulation of data transmitted by 8 transmission antennas (DM-RS: Data Demodulation-RS).

The CSI-RS for channel measurement is designed for the purpose of channel measurement, which is different from the conventional CRS that is used for both measurement, such as channel measurement and handover measurement, and data demodulation. This CSI-RS may also be used for handover measurement, etc. Since the CSI-RS is transmitted only for obtaining channel state information, the CSI-RS does not have to be transmitted for each subframe, as opposed to the conventional CRS. To reduce the overhead of the CSI-RS, the CSI-RS is transmitted intermittently on the time axis.

An LTE-A system supports up to 8 transmission antennas for downlink transmission of the base station. If an RS for up to 8 transmission antennas is transmitted over the whole frequency band for each subframe in the same way as the CRS of the existing LTE system, the RS overhead becomes too large. Therefore, two types of RSs are added to the LTE-A system: a CSI-RS for CSI measurement to select MCS, PMI, etc. and a DM-RS for data modulation. The CSI-RS is designed mainly for CSI acquisition, although it may be used for RRM measurement as well. Since the CSI-RS is not used for data demodulation, the CSI-RS does not have to be transmitted for each subframe. To reduce the overhead of the CSI-RS, the CSI-RS is transmitted intermittently on the time axis. In other words, the CSI-RS may be transmitted repeatedly with a period of an integer multiple of one subframe or transmitted with a specific transmission pattern. At this time, the eNB may determine the period or pattern by which the CSI-RS is transmitted.

To measure a CSI-RS, the UE has to be aware of the information about a transmission subframe index of the CSI-RS for each CSI-RS antenna port of a cell to which the UE belongs, the time-frequency position of a CSI-RS resource element (RE) within the transmission subframe, and a CSI-RS sequence.

The eNB in the LTE-A system has to transmit a CSI-RS to each of up to eight antenna ports. Resources used for CSI-RS transmission of different antenna ports have to be orthogonal to each other. When one eNB transmits CSI-RSs for different antenna ports, the eNB may allocate the resources orthogonally according to the FDM/TDM scheme by mapping the CSI-RS for each antenna port to a different RE. Similarly, the CSI-RSs for different antenna ports may be transmitted according to the CDM scheme in which the CSI-RSs are mapped to orthogonal codes.

When an eNB notifies information of a CSI-RS to a UE in its own cell, the information of the time-frequency in which the CSI-RS for each antenna port is mapped should be notified. Particularly, the information includes the subframe numbers on which the CSI-RS is transmitted, the period of the CSI-RS being transmitted, the subframe offset in which the CSI-RS is transmitted, the OFDM symbol number in which the CSI-RS RE of a specific antenna is transmitted, the frequency spacing, the offset or shift value of RE on the frequency axis.

The CSI-RS is transmitted through 1, 2, 4 or 8 antenna ports. In this case, the antenna port which is used is p=15, p=15,16, p=15, . . . , 18, or p=15, . . . , 22. The CSI-RS may be defined only for the subcarrier interval Δf=15 kHz.

In the subframe configured to transmit the CSI-RS, the CSI-RS sequence is mapped to the complex-valued modulation symbol a_k,l"(p) that is used as a reference symbol on each antenna port (p) as represented by Equation 12 below.

[Equation 12]

$$a_{k,l}^{(p)} = w_{l''} \cdot r_{l,n_s}(m')$$

$$k = k' + 12m + \begin{cases} -0 & \text{for } p \in \{15, 16\}, \text{normal cyclic prefix} \\ -6 & \text{for } p \in \{17, 18\}, \text{normal cyclic prefix} \\ -1 & \text{for } p \in \{19, 20\}, \text{normal cyclic prefix} \\ -7 & \text{for } p \in \{21, 22\}, \text{normal cyclic prefix} \\ -0 & \text{for } p \in \{15, 16\}, \text{extended cyclic prefix} \\ -3 & \text{for } p \in \{17, 18\}, \text{extended cyclic prefix} \\ -6 & \text{for } p \in \{19, 20\}, \text{extended cyclic prefix} \\ -9 & \text{for } p \in \{21, 22\}, \text{extended cyclic prefix} \end{cases}$$

$$l = l' + \begin{cases} l'' & \text{CSI reference signal configurations} \\ & \text{0-19, normal cyclic prefix} \\ 2l'' & \text{CSI reference signal configurations} \\ & \text{20-31, normal cyclic prefix} \\ l'' & \text{CSI reference signal configurations} \\ & \text{0-27, extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 12 above, (k',l') (herein, k' is a subcarrier index in a resource block, and l' represents an OFDM symbol index in a slot) and the condition of n_s is determined according to the CSI-RS configuration shown in Table 3 or Table 4 below.

Table 3 exemplifies the mapping of (k',l') according to the CSI-RS configuration for the normal CP.

TABLE 3

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 1 and 2  0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |

TABLE 3-continued

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Table 4 exemplifies the mapping of (k',l') according to the CSI-RS configuration for the extended CP.

TABLE 4

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Referring to Table 3 and Table 4, for the CSI-RS transmission, in order to decrease the inter-cell interference (ICI)

in the multi-cell environment including the heterogeneous network (HetNet) environment, different configurations of maximum 32 (in the case of normal CP) or maximum 28 (in the case of extended CP) are defined.

A CSI-RS configuration differs depending on the number of antenna ports in a cell, and neighboring cells are configured as differently as possible. Also, the CSI-RS configuration may be applied to both an FDD frame and a TDD frame or only a TDD frame, depending on the frame structure.

Based on Table 3 and Table 4, (k',l') and n_s are determined according to the CSI-RS configuration, and time-frequency resources used for CSI-RS transmission are determined for each CSI-RS antenna port.

Figure 8:
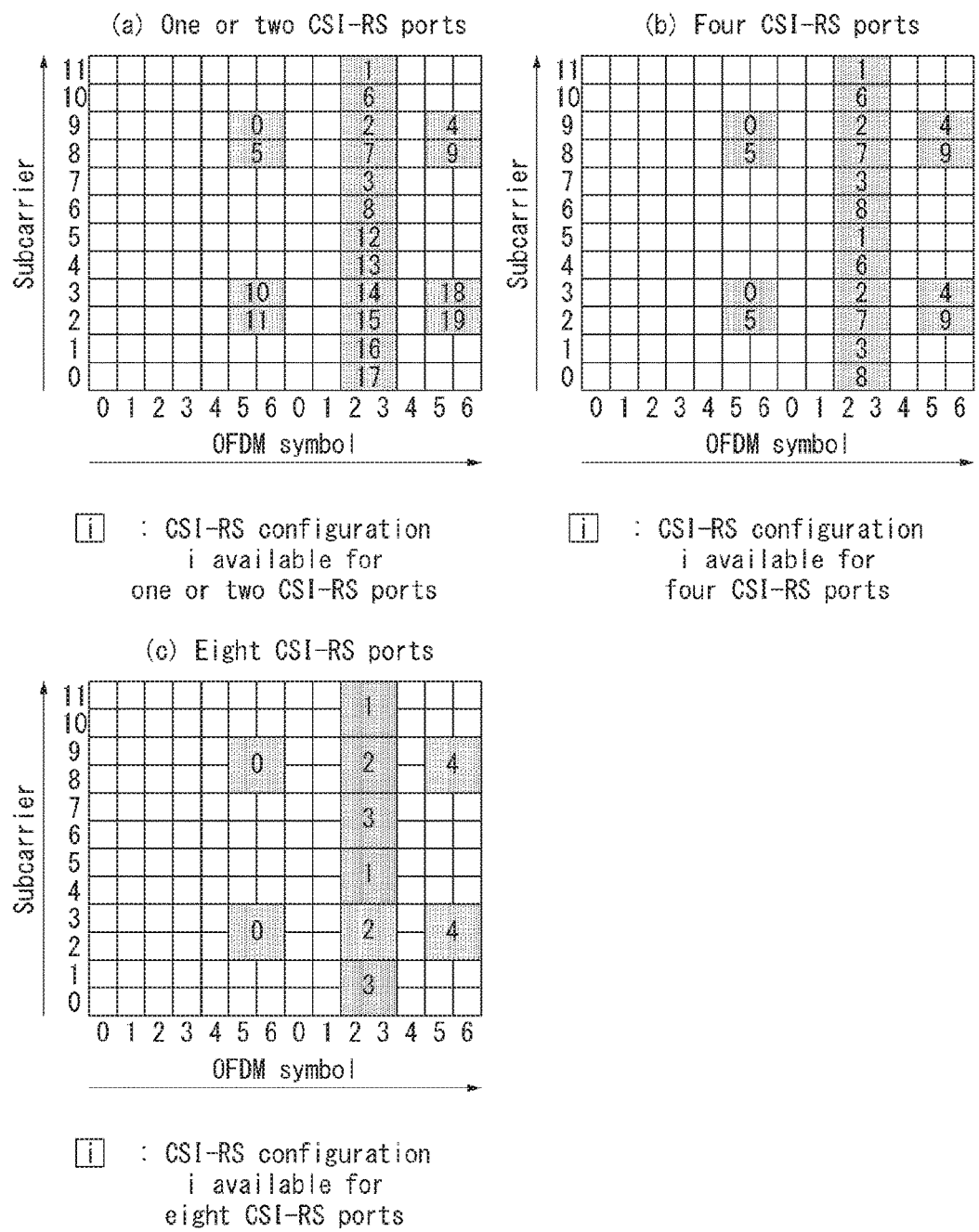
FIG. 8 is a diagram illustrating resources to which reference signals are mapped in a wireless communication system to which the present invention may be applied.

FIG. 8 is a diagram illustrating resources to which reference signals are mapped in a wireless communication system to which the present invention may be applied. Particularly, FIG. 8 illustrates CSI-RS patterns for 1, 2, 4, or 8 CSI-RS antenna ports within a subframe to which normal CP is applied.

(a) of FIG. 8 shows 20 CSI-RS configurations available for CSI-RS transmission by 1 or 2 CSI-RS antenna ports, (b) of FIG. 8 shows 10 CSI-RS configurations available for CSI-RS transmission by 4 CSI-RS antenna ports, and (c) of FIG. 8 shows 5 CSI-RS configurations available for CSI-RS transmission by 8 CSI-RS antenna ports.

In this way, radio resources (i.e., an RE pair) in which a CSI-RS is transmitted are determined depending on each CSI-RS configuration.

When one or two antenna ports are configured for CSI-RS transmission with respect to a specific cell, the CSI-RS is transmitted on radio resources according to a configured CSI-RS configuration among the 20 CSI-RS configurations shown in (a) of FIG. 8.

Likewise, when four antenna ports are configured for CSI-RS transmission with respect to a specific cell, the CSI-RS is transmitted on radio resources according to a configured CSI-RS configuration among the 10 CSI-RS configurations shown in (b) of FIG. 8. Furthermore, when eight antenna ports are configured for CSI-RS transmission with respect to a specific cell, the CSI-RS is transmitted on radio resources according to a configured CSI-RS configuration among the 5 CSI-RS configurations shown in (c) of FIG. 8.

The CSI-RS for each of the antenna ports is transmitted by CDM on the same radio resource for each of two antenna ports (i.e., {15,16}, {17,18}, {19,20}, {21,22}). For example, although the respective CSI-RS complex symbols are the same for antenna ports 15 and 16, the CSI-RS complex symbols are mapped to the same radio resource by being multiplied by different orthogonal codes (e.g., Walsh code). The complex symbol of the CSI-RS for antenna port 15 is multiplied by [1, 1], and the complex symbol of the CSI-RS for antenna port 16 is multiplied by [1, −1], and the complex symbols are mapped to the same radio resource. This procedure is the same for antenna ports {17,18}, {19,20} and {21,22}.

A UE may detect a CSI-RS for a specific antenna port by multiplying the CSI-RS by code by which a transmitted symbol is multiplied. That is, in order to detect the CSI-RS for the antenna port 15, the UE multiplies the CSI-RS by multiplied code [1 1]. In order to detect the CSI-RS for the antenna port 16, the UE multiplies the CSI-RS by multiplied code [1−1].

Referring to (a) and (b) of FIG. 8, if CSI-RS configurations correspond to the same CSI-RS configuration index, radio resources according to a CSI-RS configuration having a larger number of antenna ports include radio resources according to a CSI-RS configuration having a smaller number of CSI-RS antenna ports. For example, in the case of a CSI-RS configuration 0, radio resources for eight antenna ports include both radio resources for four antenna ports and radio resources for one or two antenna ports.

Figure 9:
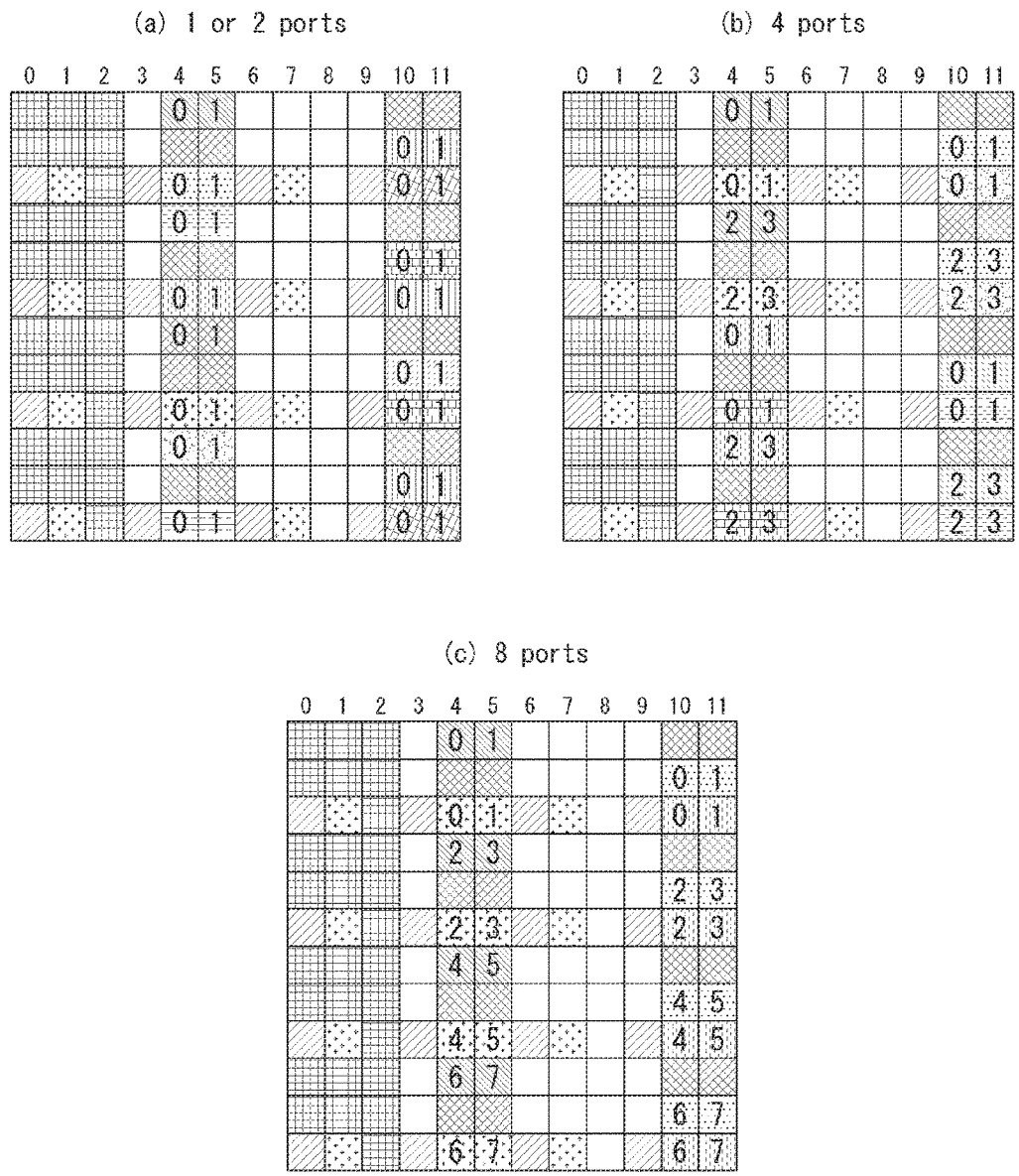
FIG. 9 is a diagram illustrating resources to which reference signals are mapped in a wireless communication system to which the present invention may be applied

FIG. 9 is a diagram illustrating resources to which reference signals are mapped in a wireless communication system to which the present invention may be applied.

Particularly, FIG. 9 illustrates CSI-RS patterns for 1, 2, 4, or 8 CSI-RS antenna ports within a subframe to which extended CP is applied.

(a) of FIG. 9 shows 16 CSI-RS configurations available for CSI-RS transmission by 1 or 2 CSI-RS antenna ports, (b) of FIG. 8 shows 8 CSI-RS configurations available for CSI-RS transmission by 4 CSI-RS antenna ports, and (c) of FIG. 8 shows 4 CSI-RS configurations available for CSI-RS transmission by 8 CSI-RS antenna ports.

In this way, radio resources (i.e., an RE pair) in which a CSI-RS is transmitted are determined depending on each CSI-RS configuration.

When one or two antenna ports are configured for CSI-RS transmission with respect to a specific cell, the CSI-RS is transmitted on radio resources according to a configured CSI-RS configuration among the 16 CSI-RS configurations shown in (a) of FIG. 9

Likewise, when four antenna ports are configured for CSI-RS transmission with respect to a specific cell, the CSI-RS is transmitted on radio resources according to a configured CSI-RS configuration among the 8 CSI-RS configurations shown in (b) of FIG. 9. Furthermore, when eight antenna ports are configured for CSI-RS transmission with respect to a specific cell, the CSI-RS is transmitted on radio resources according to a configured CSI-RS configuration among the 4 CSI-RS configurations shown in (c) of FIG. 9. A plurality of CSI-RS configurations may be used in one cell. Only 0 or 1 CSI-RS configuration may be used in a non-zero power (NZP) CSI-RS, and only 0 or several CSI-RS configurations may be used in a zero power (ZP) CSI-RS.

In a ZeroPower (ZP) CSI-RS that is a bitmap of 16 bits configured by a higher layer, a UE assumes zero transmission power in REs (e.g., excluding an RE redundant with an RE that assumes a NZP CSI-RS configured by a higher layer) corresponding to the 4 CSI-RS columns in Table 3 and Table 4 for each bit set to 1. The most significant bit (MSB) corresponds to the lowest CSI-RS configuration index, and the next bit within the bitmap sequentially corresponds to the next CSI-RS configuration index.

The CSI-RS is transmitted only in a downlink slot satisfying the condition of "n_s mod 2" and a subframe satisfying a CSI-RS subframe configuration, as shown in Table 3 and Table 4.

In the case of the frame structure type 2 (TDD), a CSI-RS is not transmitted in a special subframe, a synchronous signal (SS), a subframe that collides against the transmission of a PBCH or SystemInformationBlockType1 (SIB 1) message, or a subframe configured to send a paging message.

Furthermore, an RE in which a CSI-RS for any antenna port belonging to the antenna port set S (S={15}, S={15, 16}, S={17, 18}, S={19,20} or S={21,22}) is transmitted is not used to send a PDSCH or a CSI-RS for another antenna port.

Data throughput is reduced as CSI-RS overhead increases because time-frequency resource used to send a CSI-RS cannot be used for data transmission. Accordingly, a CSI-RS is not configured to be transmitted for each subframe, but is configured to be transmitted in each specific transmission period corresponding to a plurality of subframes by taking into consideration the reduction in the data throughput. In this case, CSI-RS transmission overhead can be reduced compared to when a CSI-RS is transmitted in each subframe.

A subframe period for CSI-RS transmission (hereinafter referred to as a "CSI transmission period") T_CSI-RS and a subframe offset A_CSI-RS are listed in Table 5 below.

Table 5 illustrates CSI-RS subframe configurations.

TABLE 5

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Referring to Table 5, a CSI-RS transmission period T_CSI-RS and a subframe offset A_CSI-RS are determined by a CSI-RS subframe configuration I_CSI-RS.

In Table 5, the CSI-RS subframe configuration may be set either by the 'SubframeConfig' field or the 'zeroTxPower-SubframeConfig' field. The CSI-RS subframe configuration may be set with respect to a NZP CSI-RS and a ZP CSI-RS separately.

A subframe including a CSI-RS satisfies Equation 13 below.

$$(10n_f + \lfloor n_s/2 \rfloor - \Delta_{CSI-RS}) \bmod T_{CSI-RS} = 0 \quad \text{[Equation 13]}$$

In Equation 13, T_CSI-RS denotes a CSI-RS transmission period, A_CSI-RS denotes a subframe offset value, n_f denotes a system frame number, and n_s denotes a slot number.

In the case of a UE in which transmission mode 9 is set for a serving cell, a single CSI-RS resource may be configured in the UE. In the case of a UE in which transmission mode 10 is set for a serving cell, one or more CSI-RS resources may be configured in the UE.

Massive MIMO

Multiple-input multiple-output (MIMO) systems with a large number of antennas, often called massive MIMO, have received much attention as a means to improve the spectral efficiency, energy efficiency, and processing complexity.

In 3GPP, a discussion has been recently initiated regarding massive MIMO systems in order to meet the requirements of spectral efficiency of future mobile communication systems. Massive MIMO is also called Full-Dimension MIMO (FD-MIMO).

In a wireless communication system after LTE Release (Rel)-12, the introduction of an active antenna system (AAS) is taken into consideration.

Unlike in an existing passive antenna system in which an amplifier and an antenna in which the phase and size of a signal can be adjusted have been separated, the AAS means a system in which each antenna is configured to include an active element, such as an amplifier.

The AAS does not require a separate cable, a connector, and other hardware for connecting an amplifier and an antenna depending on use of an active antenna and thus has high efficiency in terms of energy and an operation cost. In particular, the AAS enables an advanced MIMO technology, such as the forming of an accurate beam pattern or 3-dimensional beam pattern in which beam direction and beam width are taken into consideration, because the AAS supports an electronic beam control method for each antenna.

Due to the introduction of an advanced antenna system, such as the AAS, a massive MIMO structure including a plurality of input/output antennas and a multi-dimensional antenna structure is also taken into consideration. For example, as opposed to the existing straight-line antenna array, if a 2-D (2-dimension) antenna array is formed, a 3-dimensional beam pattern may be formed by the active antenna of the AAS.

Figure 10:
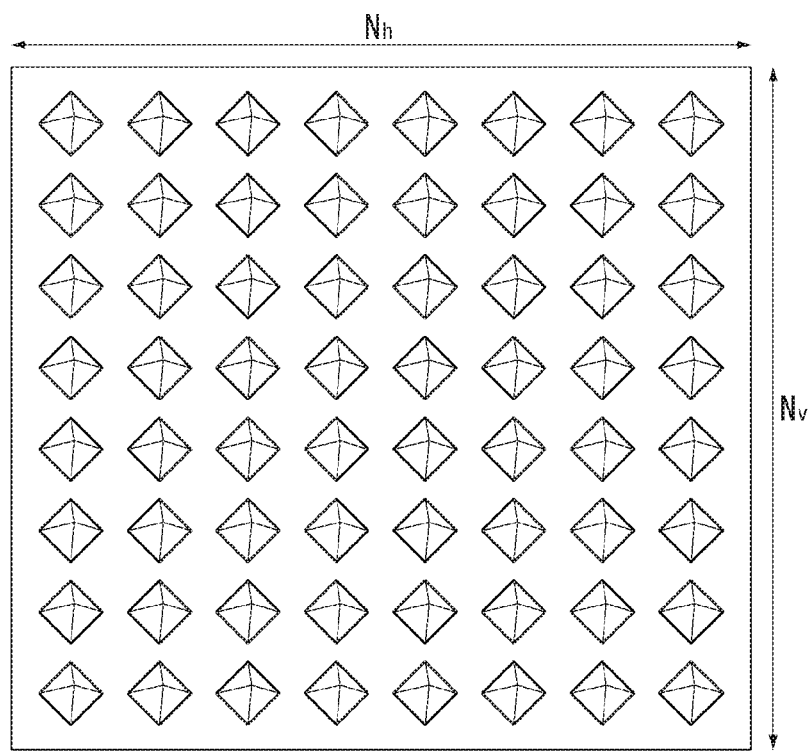
FIG. 10 illustrates a 2-dimensional active antenna system having 64 antenna elements, in a wireless communication system to which the present invention may be applied.

FIG. 10 illustrates a 2-dimensional active antenna system having 64 antenna elements, in a wireless communication system to which the present invention may be applied.

FIG. 10 illustrates a general 2D (2-dimension) antenna array, and N_t=N_v*N_h antennas may have a square shape as in FIG. 10. Here, N_h denotes the number of antenna columns in a horizontal direction, and N_v denotes the number of antenna rows in a vertical direction.

Using such an antenna array with a 2D structure, radio waves may be controlled both in a vertical direction (elevation) and a horizontal direction (azimuth) so as to control transmission beams on a three-dimensional space.

Figure 11:
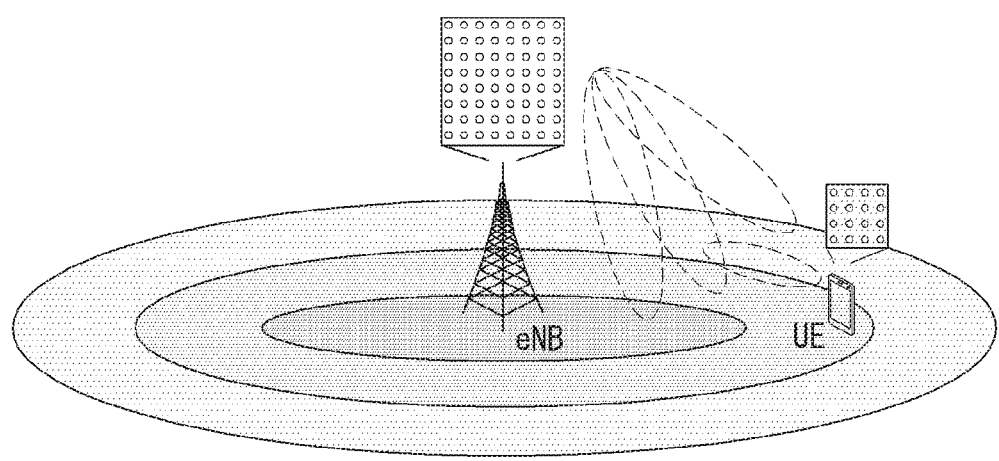
FIG. 11 illustrates a system that a base station or terminal has a plurality of transmission/reception antennas capable of forming an AAS-based 3D (3-Dimension) beam, in a wireless communication system to which the present invention may applied.

FIG. 11 illustrates a system that a base station or terminal has a plurality of transmission/reception antennas capable of forming an AAS-based 3D (3-Dimension) beam, in a wireless communication system to which the present invention may applied.

FIG. 11 is a schematic view of the aforementioned example, which illustrates a 3D-MIMO system utilizing a 2-dimensional antenna array (i.e., 2D-AAS).

If the 3D beam pattern is used from the viewpoint of a transmission antenna, semi-static or dynamic beamforming not only in a horizontal direction of a beam but also in a vertical direction may be performed and, for example, applications such as sectorization of a vertical direction may be considered.

In addition, from the viewpoint of a reception antenna, when a received beam is formed using a massive reception antenna, signal power may be increased according to antenna array gain. Accordingly, in uplink, the base station may receive a signal from the UE via a plurality of antennas. At this time, the UE may set its transmit power very low in consideration of gain of a massive reception antenna in order to reduce interference.

Figure 12:
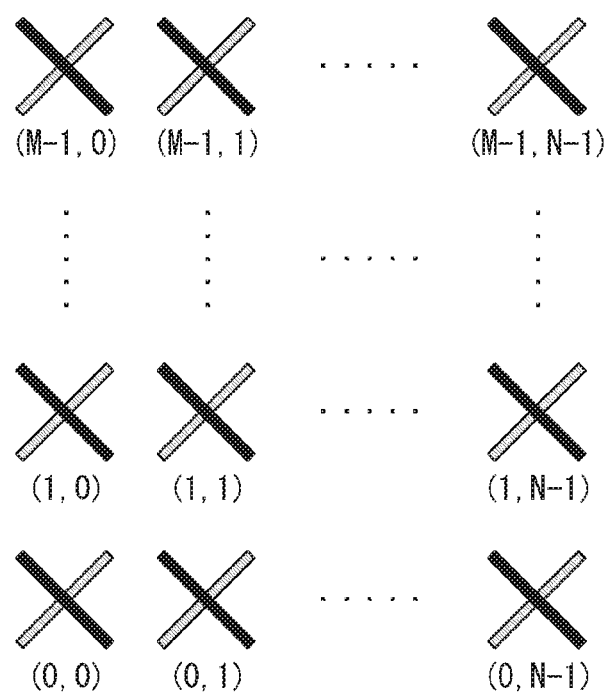
FIG. 12 illustrates a two-dimensional antenna system with cross polarization in a wireless communication system to which the present invention may be applied.

FIG. 12 illustrates a two-dimensional antenna system with cross polarization in a wireless communication system to which the present invention may be applied.

A 2D planar antenna array model with polarization taken into account may be schematized as in FIG. 12.

As opposed to the existing MIMO system using passive antennas, a system based on active antennas may dynamically adjust the gain of antenna elements by applying a weight to an active device (e.g., amplifier) attached (or included) to each antenna element. A radiation pattern depends on an antenna arrangement such as the number of antenna elements, antenna spacing, etc., so the antenna system may be modeled at the antenna element level.

The antenna array model illustrated in FIG. 12 may be represented by (M, N, P) which corresponds to parameters characterizing the antenna array structure.

M represents the number of antenna elements with the same polarization in each column (vertical direction) (i.e., the number of antenna elements with a +45° slant in each column or the number of antenna elements with a −45° slant in each column).

N represents the number of columns in horizontal direction (i.e., the number of antenna elements in horizontal direction).

P represents the number of polarization dimensions. As in FIG. 11, P=2 for cross polarization, and P=1 for co-polarization.

Antenna ports may be mapped to physical antenna elements. An antenna port may be defined by a reference signal associated with the corresponding antenna port. For example, in an LTE system, antenna port 0 may be associated with a CRS (Cell-specific Reference Signal), and antenna port 6 may be associated with a (Positioning Reference Signal) PRS.

For example, antenna ports and physical antenna elements may be mapped to each other one-to-one. This applies when a single cross-polarization antenna element is used for downlink MIMO or downlink transmission diversity. For example, antenna port 0 may be mapped to one physical antenna element, and antenna port 1 may be mapped to another physical antenna element. In this case, for the UE, two downlink transmissions exist. One is associated with a reference signal for antenna port 0, and the other is associated with a reference signal for antenna port 1.

In another example, a signal antenna port may be mapped to multiple physical antenna elements. This applies when this antenna port is used for beamforming. In beamforming, downlink transmission may be directed toward a specific UE by using multiple physical antenna elements. Generally, this may be achieved by using an antenna array consisting of multiple columns of multiple cross-polarization antenna elements. In this case, for the UE, a single downlink transmission exists. One is associated with a reference signal for antenna port 0, and the other is associated with a reference signal for antenna port 1.

That is, antenna ports represent downlink transmissions to a UE, rather than actual downlink transmission from a base station through physical antenna elements.

In another example, a plurality of antenna ports are used for downlink transmission, and each antenna port may be mapped to multiple physical antenna elements. This applies when an antenna array is used for downlink MIMO or downlink diversity. For example, antenna ports 0 and 1 each may be mapped to multiple physical antenna elements. In this case, for the UE, two downlink transmissions exist. One is associated with a reference signal for antenna port 0, and the other is associated with a reference signal for antenna port 1.

In FD-MIMO, the MIMO precoding of a data stream goes through antenna port virtualization, transceiver unit (TXRU) virtualization, and an antenna element pattern.

In antenna port virtualization, a stream on an antenna port is precoded on TXRUs. In TXRU virtualization, a TXRU signal is precoded on antenna elements. In an antenna element pattern, a signal radiated from an antenna element may have a directional gain pattern.

In a conventional transceiver modeling, it is assumed that antenna ports and TXRUs are statically mapped one to one, and a TXRU virtualization effect is integrated in a static (TXRU) antenna pattern that includes both the effects of TXRU virtualization and antenna element patterns.

Antenna port virtualization may be performed in frequency-selective manner. In LTE, an antenna port is defined in conjunction with a reference signal (or pilot). For example, for precoded data transmission on an antenna port, a DMRS is transmitted on the same bandwidth as the data signals, and both DMRS and data are precoded with the same precodeder (or with the same TXRU virtualization precoding). For CSI estimation, on the other hand, CSI-RS is transmitted on multiple antenna ports. For CSI-RS transmissions, the precoder characterizing the mapping between CSI-RS ports and TXRUx can be designed as a unique matrix to enable a UE to estimate a TXRU virtualization precoding matrix for data precoding vectors.

Two TXRU virtualization methods will be discussed: 1D TXRU virtualization and 2D TXRU virtualization, which will be described below with reference to the drawings.

Figure 13:
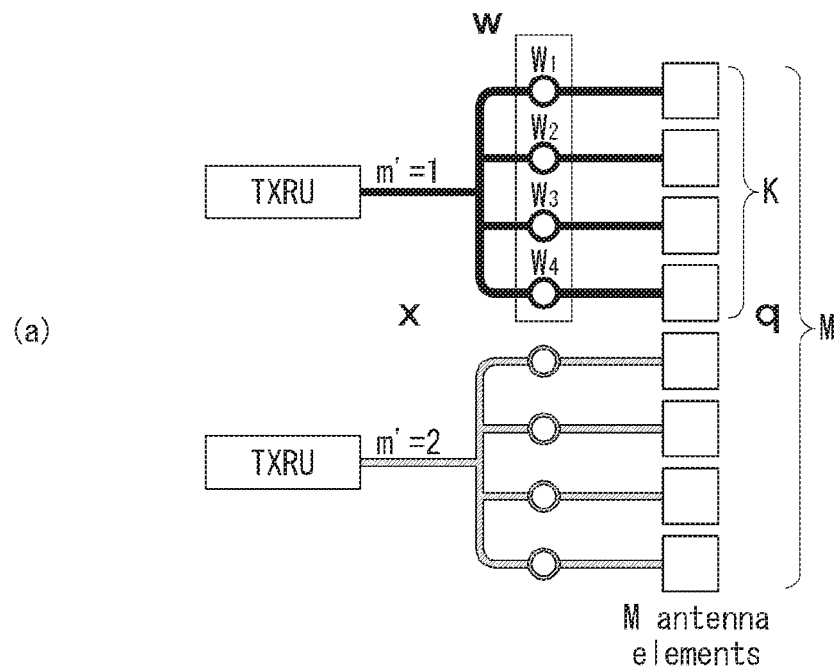
FIG. 13 illustrates a transceiver unit model in a wireless communication system to which the present invention may be applied.
Figure 13:
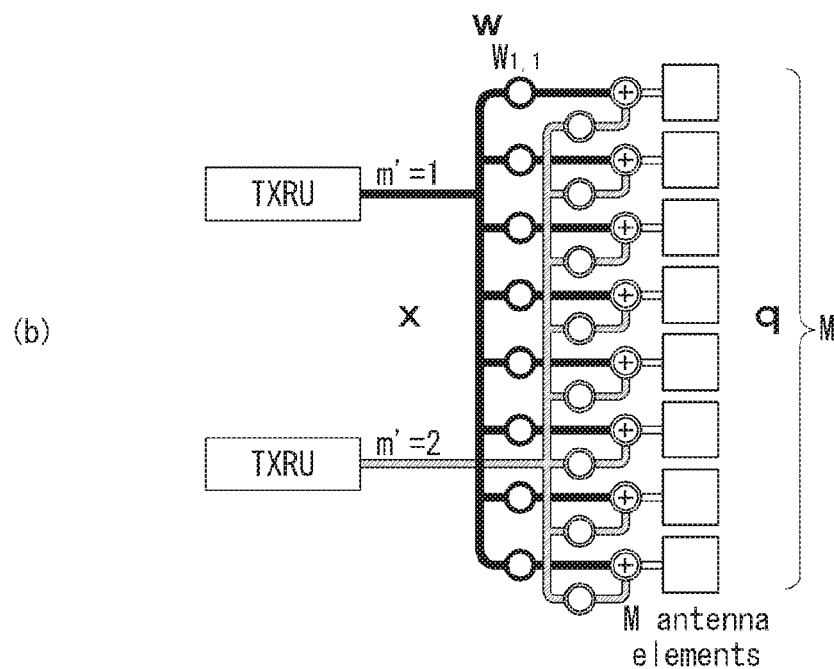

FIG. 13 illustrates a transceiver unit model in a wireless communication system to which the present invention may be applied.

In 1D TXRU virtualization, M_TXRU TXRUs are associated with only those M antenna elements comprising a column antenna array with the same polarization.

In 2D TXRU virtualization, a TXRU model configuration matching the above antenna array model configuration (M, N, P) of FIG. 12 may be represented by (M_TXRU, N, P). Here, M_TXRU denotes the number of 2D TXRUs present in the same polarization in the same column, and M_TXRU≤M is always satisfied. That is, the total number TXRUs is equal to M_TXRU×N×P.

TXRU virtualization models may be divided into a TXRU virtualization model option-1: sub-array partition model shown in (a) of FIG. 13 and a TXRU virtualization model option-2: full-connection model shown in (b) of FIG. 13, depending on the correlation between an antenna element and a TXRU.

Referring to (a) of FIG. 13, in the case of a sub-array partition model, an antenna element is split into multiple antenna element groups, and each TXRU is connected to one of the groups.

Referring to (b) of FIG. 13, in the case of a full-connection model, signals of multiple TXRUs are combined and delivered to a single antenna element (or antenna element array).

In FIG. 13, q is a transmission signal vector of M co-polarized antenna elements within a column. w is a wideband TXRU virtualization weight vector, and W is a wideband TXRU virtualization weight matrix. X is a signal vector of M_TXRU TXRUs.

Here, antenna ports and TXRUs may be mapped 1-to-1 or 1-to-many.

The TXRU-to-element mapping of FIG. 13 is only an example, and the present invention is not limited to the specific example. The present invention may be equally applied in terms of hardware to the mapping between the TXRU and antenna elements that can be implemented in various other forms.

Channel State Information Transmission/Reception Method

In a massive MIMO system using a 2D-AAS antenna structure, it is necessary to support/design a CSI-RS pattern for a large number of reference signal (RS) ports in order for a UE to acquire CSI and report the CSI to a base station. Typically, the legacy system supports a 1-port, 2-port, 4-port or 8-port CSI RS pattern and Rel. 13 supports 12-port and 16-port patterns realized by aggregating the conventional 4-port and 8-port CSI-RS patterns. To achieve higher spectral efficiency, it is necessary to consider new CIS-RS patterns for a larger number of ports (e.g., 20 ports, 24 ports, 32 ports and 64 ports) and a method of configuring the same.

To support effective (closed-loop) MIMO transmission from a transmitter including a large number of (e.g., M×N×P) transmission antenna elements such as in a massive MIMO system, a Q-port CSI-RS pattern (e.g., Q≤MNP) may be set for a UE. In this case, the UE needs to be able to measure such a Q-port CSI-RS to drive/calculate CSI. Such a Q-port CSI-RS is a non-precoded CSI-RS, and beamforming is not applied to the Q-port CSI-RS when the Q-port CSI-RS is transmitted from a transmitter, and the Q-port CSI-RS may be transmitted in such a manner that it is transmitted through each CSI-RS port having a wide beam width.

To design a new CSI-RS pattern in order to accomplish the aforementioned purpose, the following options may be considered.

First embodiment: a method of aggregating and using legacy patterns (2-, 4- and 8-port patterns) and 12- and 16-port patterns defined in Rel. 13

Second embodiment: a method of defining a new pattern

The second embodiment is a method of defining a plurality of CSI-RS patterns by selecting/using at least one of CSI-RS designs defined/represented by the first embodiment.

As a specific embodiment with respect to the first embodiment, a 20-port CSI-RS resource/pattern may be considered. To generate the 20-port CSI-RS resource/pattern, ten 2-port CSI-RS resources/patterns or five 4-port CSI-RS resources/patterns may be aggregated. When ten 2-port CSI-RS resources/patterns are aggregated, a total of $_{20}C_{10}=184756$ 20-port CSI-RS resources/patterns can be derived. When five 4-port CSI-RS resources/patterns are aggregated, a total of $_{10}C_5=252$ 20-port CSI-RS resources/patterns can be derived.

Figure 14:
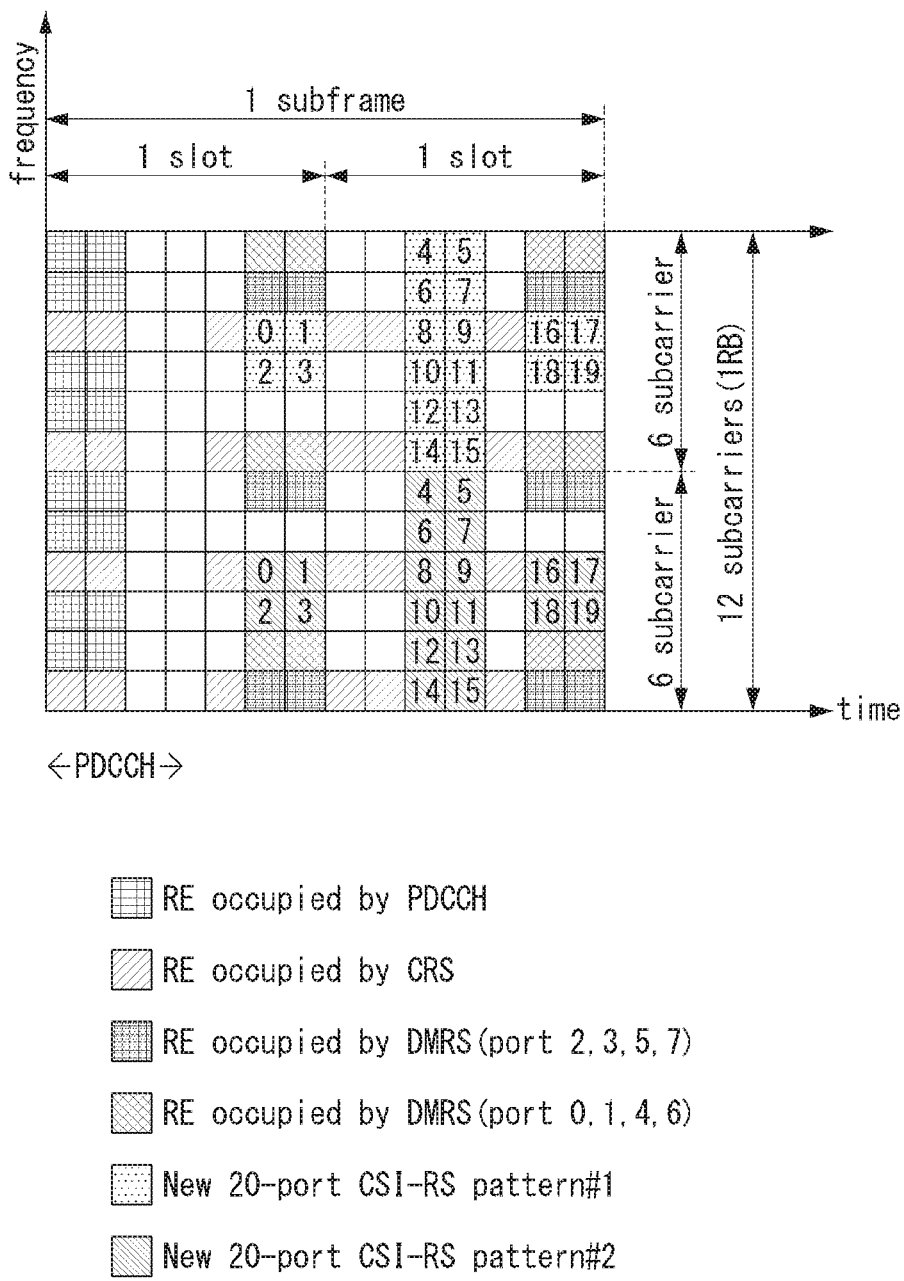
FIG. 14 illustrates a 20-port CSI-RS resource/pattern realized by aggregating 2-port CSI-RS resources/patterns according to an embodiment of the present invention.

FIG. 14 illustrates a 20-port CSI-RS resource/pattern obtained by aggregating 2-port CSI-RS resources/patterns according to an embodiment of the present invention. Although 2-port CSI-RS resource/pattern aggregation improves network flexibility, it may increase complexity.

Figure 15:
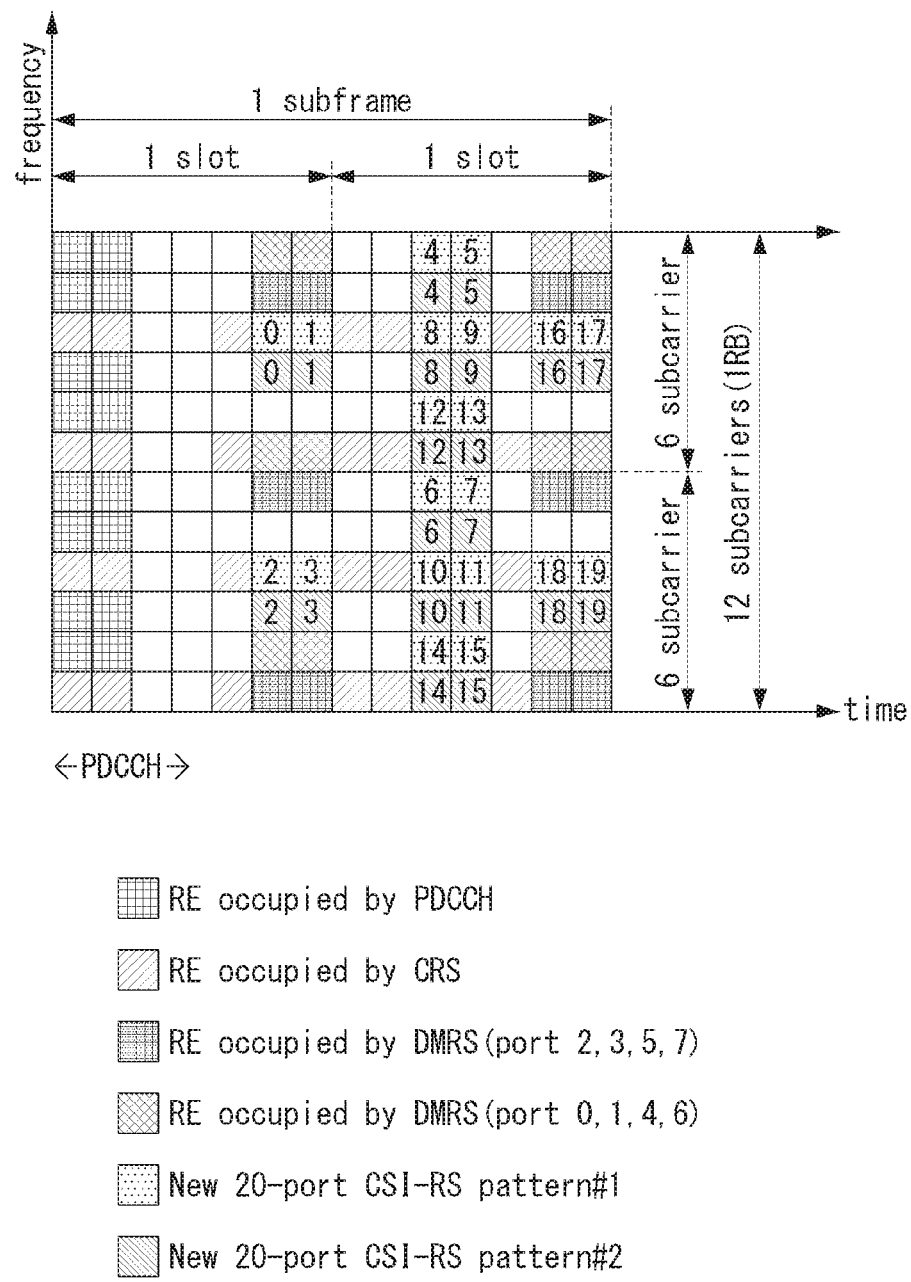
FIG. 15 illustrates a 20-port CSI-RS resource/pattern realized by aggregating 4-port CSI-RS resources/patterns according to an embodiment of the present invention.

FIG. 15 illustrates a 20-port CSI-RS resource/pattern obtained by aggregating 4-port CSI-RS resources/patterns according to an embodiment of the present invention. Particularly, FIG. 15 illustrates a 20-port CSI-RS resource/pattern composed of legacy 4-port CSI-RS resources/patterns.

A "port numbering method" for (re)allocating/assigning port numbers to antenna ports used to transmit a CSI-RS resource/pattern designed for a large number of ports when a CSI-RS resource/pattern for a larger number of ports is designed by aggregating legacy port CSI-RS resources/patterns as described above will be described. The "port numbering method" may also be referred to as a "port numbering switching method" because new port numbers instead of port numbers pre-allocated/pre-mapped to aggregated ports may be allocated/mapped when the port numbering method is applied.

The port numbering method may include the following two embodiments (third and fourth embodiments).

Third embodiment: a method of sequentially numbering aggregated CSI-RS resources (or ports mapped to aggregated CSI-RS resources)

Fourth embodiment: a method of numbering ports such that legacy UEs (or UEs to which Rel. 13 is applied) can also reuse/measure a CSI-RS The third and fourth embodiments will be described in more detail later with reference to FIGS. 16 and 17.

Figure 16:
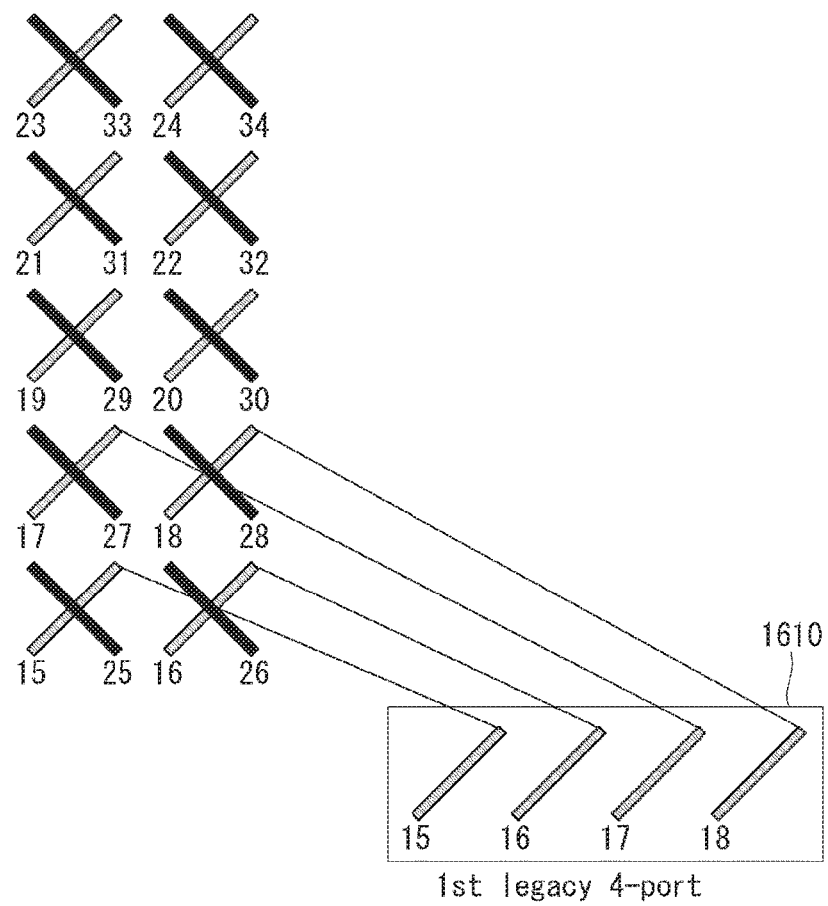
FIGS. 16 and 17 illustrate a port numbering method according to a third embodiment of the present invention.
Figure 17:
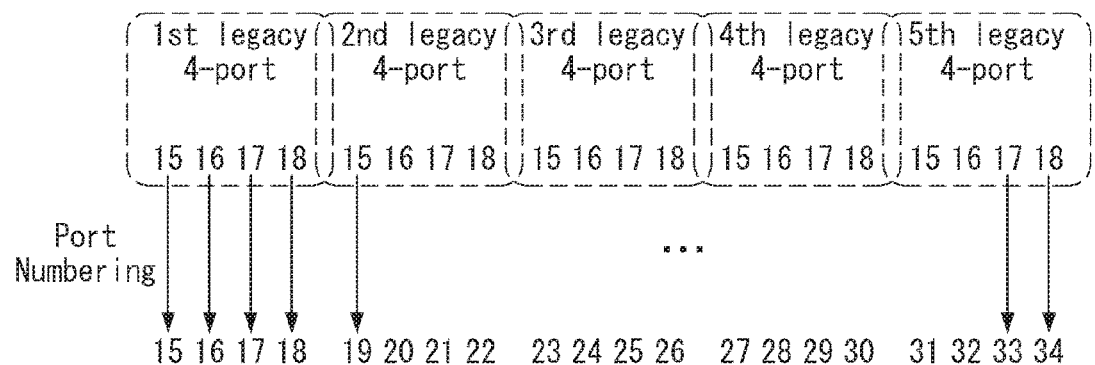

FIGS. 16 and 17 illustrate a port numbering method according to the third embodiment of the present invention.

According to the third embodiment, antenna ports having the same polarization may be sequentially numbered first for only UEs (hereinafter referred to as "next-generation UEs") capable of analyzing/measuring/recognizing CSI-RS patterns/resources for a larger number of ports (or CSI-RS pattern/resources obtained by aggregating n-port CSI-RS resources) without considering CSI-RS measurement/reuse of legacy UEs.

For example, in FIG. 16, ports having first polarization denoted by "/" can be sequentially numbered from the left to the right and from the bottom to the top and ports having second polarization represented by "\" can be sequentially numbered in the same order. However, this is an embodiment and the port numbering method may be extended in various manners in such a manner that ports having the same polarization are sequentially numbered from the bottom to the top and from the left to the right or ports having second polarization instead of first polarization are numbered first.

In other words, port numbering can be sequentially performed on antennas having the same polarization. Here, a numbering direction may be determined in various manners according to embodiments.

When the port numbering method illustrated in the figure is represented by an equation, Equation 14 can be derived.

$$l=(k-1)L+p', \ p'=15, \ldots, +14+L, \ k=1, \ldots, K. \quad \text{[Equation 14]}$$

Here, L indicates the number of ports of CSI-RS resources/patterns aggregated/included in a CSI-RS resource/pattern which is a port numbering target, K indicates the number of aggregated/included CSI-RS resources/patterns, p' is an aggregated legacy CSI-RS port number, LK denotes a total number of ports, l is a final CSI-RS port number according to a port numbering result (or aggregated/mapped CSI-RS port number) and K represents an aggregated CSI-RS resource number.

When the port numbering method according to Equation 14 is schematized as an embodiment of 20 ports obtained by aggregating five sets of 4 legacy ports, the port numbering method can be illustrated as FIG. 17. Referring to FIG. 17, K aggregated legacy CSI-RS resources (K=5) are (re)numbered/mapped in ascending order of aggregated CSI-RS resource numbers (k=1, 2, 3, 4, 5), and ports belonging to each CSI-RS resource number may be (re)numbered/mapped to final CSI-RS port numbers (i.e., 15 to 34) in ascending order according to Equation 14.

Figure 18:
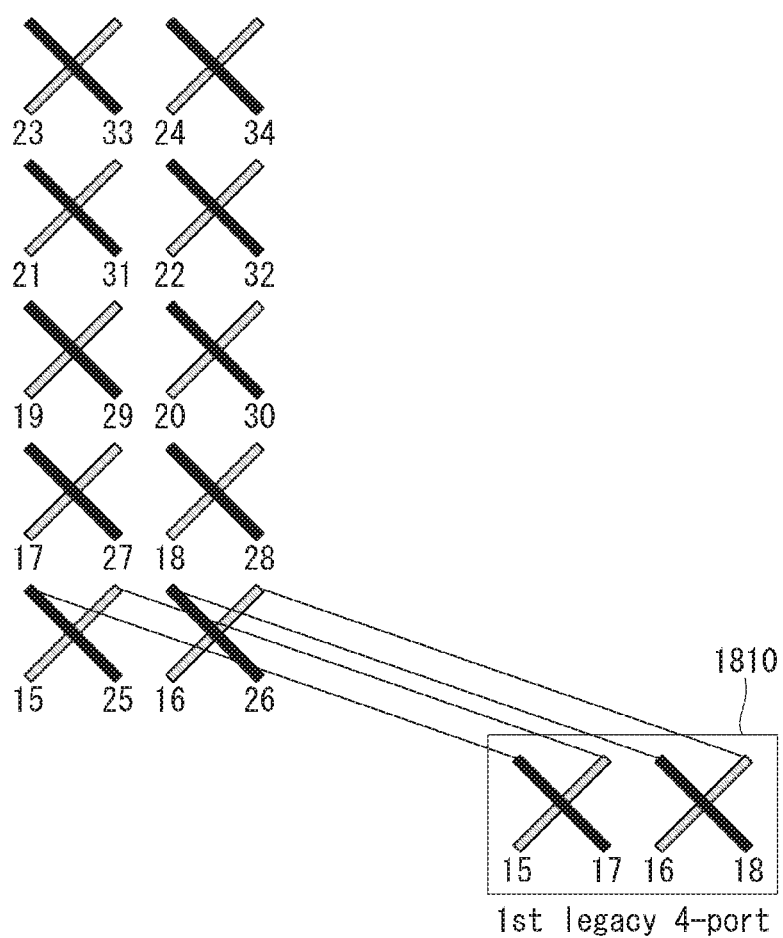
FIGS. 18 and 19 illustrate a port numbering method according to a fourth embodiment of the present invention.

In this manner, the first legacy 4-port numbers {15, 16, 17, 18} aggregated into 20 ports, shown in FIGS. 16 and 18, are numbered/mapped/assigned to only ports 1610 having first polarization. Accordingly, some of the 20 ports cannot be reused to transmit a CSI-RS to a UE to which a legacy 4-port CSI-RS resource using an X-pol (or cross pol) codebook is allocated. That is, a base station cannot reuse some of the 20 ports for CSI-RS transmission to next-generation UEs to transmit a CSI-RS to a legacy UE and the legacy UE also cannot reuse/measure the 20-port CSI-RS transmitted from the base station. However, according to the present embodiment, overhead can be reduced according to CSI-RS sharing between next-generation UEs and legacy UEs.

Figure 19:
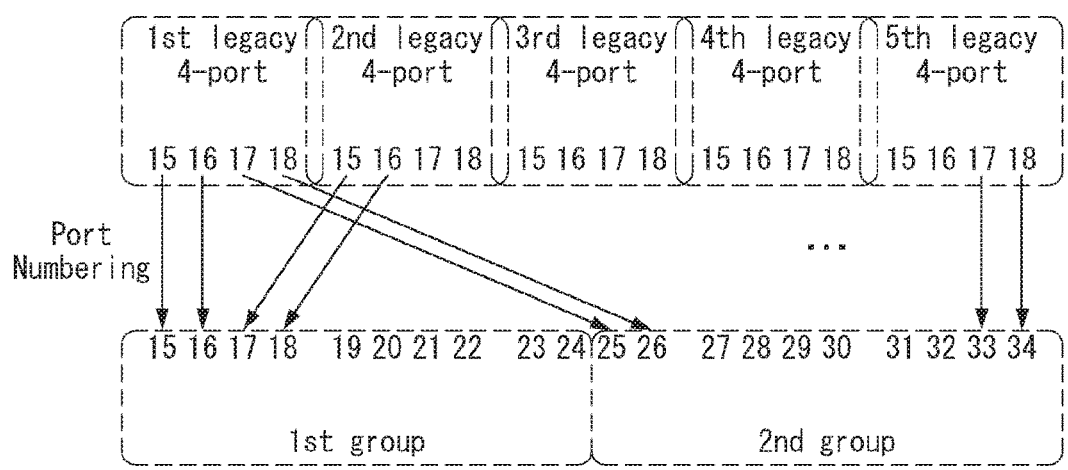

FIGS. 18 and 19 illustrate a port numbering method according to the fourth embodiment of the present invention. These figures show an example of configuring 20 ports by aggregating five sets of 4 legacy ports to enable legacy UEs to reuse a CSI-RS (or reuse antenna ports used to transmit a CSI-RS).

Distinguished from the third embodiment, port numbering in consideration of CSI-RS measurement/reuse of legacy UEs can be performed in the fourth embodiment. More specifically, numbering is performed in a specific port unit 1810 (4 ports configured in an X-pol structure in the case of the embodiment shown in FIG. 18), and ports having the same polarization may be sequentially numbered in each port unit 1810.

For example, 4 ports 1810 composed of two different polarization pairs may be set as a port numbering unit in FIG. 18. Here, two ports having first polarization represented by "/" may be sequentially numbered from the left to the right and the remaining ports having second polarization represented by "\" may also be sequentially numbered from the left to the right in the 4 ports 1810. However, this is exemplary and the unit of numbered ports, a numbering direction per port unit and/or a numbering direction for ports having the same polarization in a port unit may be set in various manners according to embodiments and are not limited to the above-described embodiment.

When the port numbering method shown in the figure may be represented by the following equation 15.

[Equation 15]
$$l = \begin{cases} p' + \frac{L}{2}k, & p' = 15, 16, \ldots, +14 + \frac{L}{2} \\ p' + \frac{L}{2}(k + K - 1), & p' = 15 + \frac{L}{2}, \ldots, +14 + L \end{cases} \text{ where}$$
$$k = 0, \ldots K - 1$$

Here, the above description with respect to Equation 14 equally/similarly applies to variables l, p', L, k and K included in this equation. However, the range of k is defined as 0 to K−1 distinguished from Equation 14. If the range of k is defined as 1 to K as in Equation 14, the following equation 16 can be derived.

[Equation 16]
$$l = \begin{cases} p' + \frac{L}{2}(k-1), & p' = 15, 16, \ldots, +14 + \frac{L}{2} \\ p' + \frac{L}{2}(k + K - 2), & p' = 15 + \frac{L}{2}, \ldots, +14 + L \end{cases} \text{ where}$$
$$k = 1, \ldots, K$$

The port numbering method according to Equations 15 and 16 may be schematized as an embodiment of 20 ports obtained by aggregating five sets of legacy 4 ports, as shown in FIG. 19. Referring to FIG. 19, K aggregated legacy CSI-RS resources (K=5) may be numbered in ascending order for aggregated CSI-RS resource numbers (k=1, 2, 3, 4, 5) according to Equation 15 or 16, wherein upper L/2 legacy port numbers in ports belonging to each CSI-RS resource number may be (re)numbered/mapped in ascending order for/to final CSI-RS port numbers (i.e., 15 to 24) included in a first group (or corresponding to first polarization "/" slant), and the remaining lower L/2 legacy port numbers may be (re)numbered/mapped in ascending order for/to final CSI-RS port numbers (i.e., 25 to 34) included in a second group (or corresponding to second polarization "\" slant).

Here, the first group corresponds to a unit of grouped upper (LK)/2 port numbers among final CSI-RS port numbers and the second group corresponds to a unit of grouped lower (LK)/2 port numbers among the final CSI-RS port numbers. Further, the first group may include final CSI-RS port numbers corresponding to ports having the first polarization and the second group may include final CSI-RS port numbers corresponding to ports having the second polarization different from the first polarization. That is, according to Equation 15, final CSI-RS numbers can be (re)numbered/mapped for a unit of legacy ports having the same polarization.

Since first legacy 4-port numbers {15, 16, 17, 18} aggregated into 20 ports, shown in FIGS. 18 and 19, are numbered/mapped/allocated for/to ports 1810 having the first polarization and the second polarization, legacy UEs using a codebook in an X-pol (or cross pol) structure can also measure/recognize a CSI-RS transmitted through the corresponding 4 ports to reuse the same. That is, "legacy UEs reuse a CSI-RS" may be interpreted as "at least some of CSI-RSs transmitted through 20 or more antenna ports to next-generation UEs can also be recognized/measured by legacy UEs" in the present specification.

Figure 20:
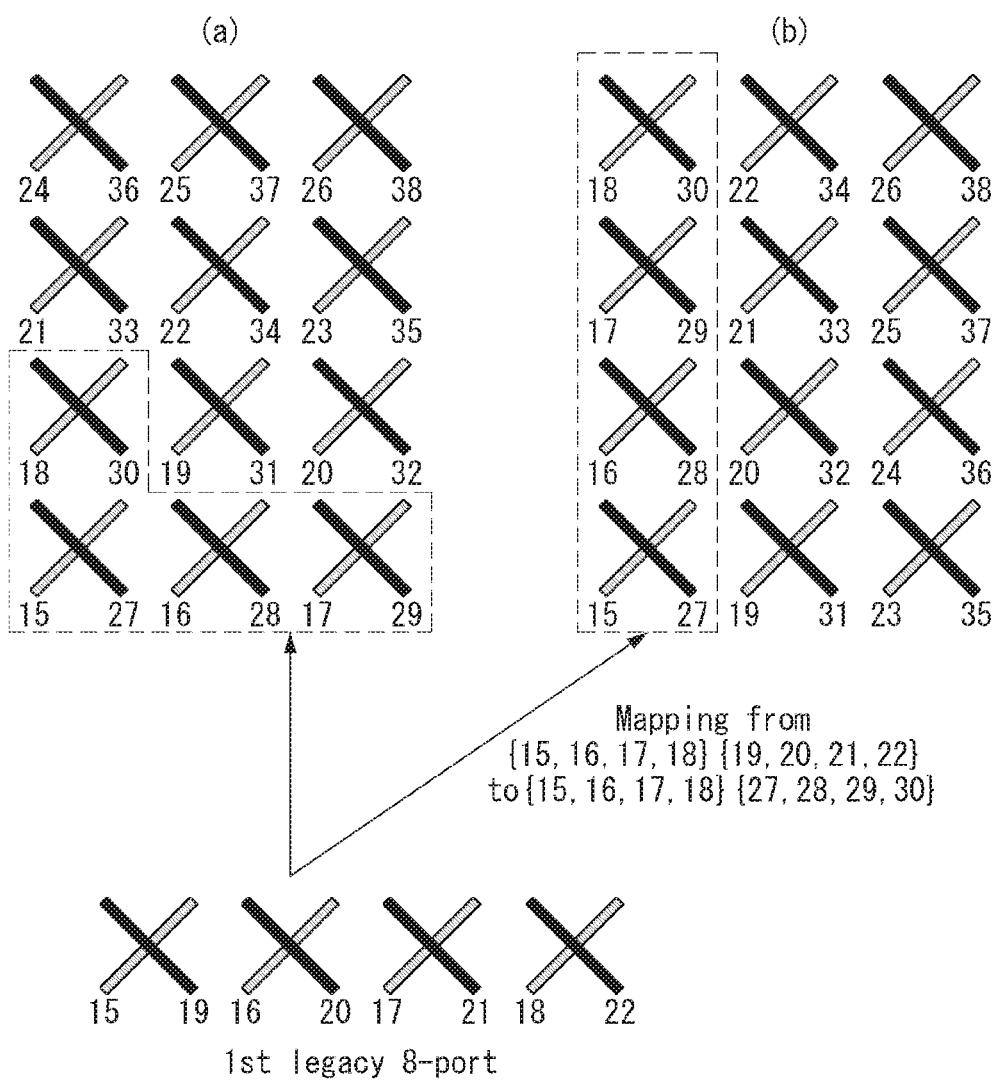
FIG. 20 illustrates a port numbering method for 24 ports through which a CSI-RS is transmitted according to an embodiment of the present invention.

FIG. 20 illustrates a port numbering method for 24 ports used to transmit a CSI-RS according to an embodiment of the present invention. In the present embodiment, it is assumed that a CSI-RS resource/pattern transmitted through 24 ports is obtained by aggregating three 9-port CSI-RS resources/patterns and 24 ports are numbered according to the above-described fourth embodiment. Particularly, FIG. 20(*a*) corresponds to an embodiment in which horizontal domain numbering is performed for 24 ports according to the fourth embodiment and FIG. 20(*b*) corresponds to an embodiment in which vertical domain numbering is performed for 24 ports according to the fourth embodiment.

When a CSI-RS is transmitted according to the embodiments of FIGS. 20(*a*) and 20(*b*), all legacy UEs can reuse/measure 8-port CSI-RSs but a CSI-RS that can be measured by a legacy 8-port UE is a CSI-RS from an antenna port layout which is deployed in the horizontal direction and is not suitable for the legacy 8-port UE. Accordingly, the CSI-RS is not adapted to a legacy 8-port codebook and thus severe performance deterioration is expected.

When the purpose of application of the fourth embodiment is reuse of legacy L ports (e.g., 2, 4, or 8 ports) (or an L-port CSI-RS), the port numbering rule according to the fourth embodiment may be applied/used only for cases in which L≤NP (here, N is the number of columns in the horizontal direction and P is the number of dimensions of polarization). In other words, port numbering according to the fourth embodiment may be applied to only cases in which the number of L ports corresponding to an aggregation unit is less than the number of antenna ports in the horizontal direction in an antenna layout of 20 or more ports in consideration of the fact that the legacy antenna layout is a 1D layout in the horizontal direction.

Alternatively, a method of performing port numbering (or port number switching) by signaling information/content about the third and fourth embodiments with respect to port numbering methods to UEs may be provided. When legacy UEs measure/reuse a CSI-RS transmitted through ports numbered according to the fourth embodiment, the legacy UEs need to estimate the CSI-RS using power of "1/K" and thus performance deterioration occurs, compared to a case in which power when a CSI-RS transmitted through ports numbered according to a legacy port numbering method is assumed to be "1". Accordingly, the port numbering method according to the fourth embodiment may be applied only when legacy UEs are located close to a base station and thus sufficient CSI-RS estimation performance is ensured with low power such that the legacy UEs can reuse/measure a CSI-RS transmitted to next-generation UEs.

When this method is normalized and extended, port numbering methods other than the third and fourth embodiments are predefined/preset and UEs may be configured/instructed to use a specific port numbering method among such port numbering methods through RRC signaling. For example, a base station may set/signal a specific port numbering method for/to UEs through CSI process setting.

A port numbering method for allowing legacy UEs (e.g., Rel. 13 UEs) (which can measure 12- and 16-port CSI-RS resources) to measure/reuse CSI-RSs composed of subsets of newly defined 20-port or more CSI-RS resources, which is realized by extending the above-described method of reusing legacy ports (e.g., the fourth embodiment), will be described below. Meanwhile, "legacy UEs reuse CSI-RSs" may mean that legacy UEs can measure/use at least some of CSI-RSs transmitted to next-generation UEs through 20 or more antenna ports to acquire CSI in the present specification.

Figure 21:
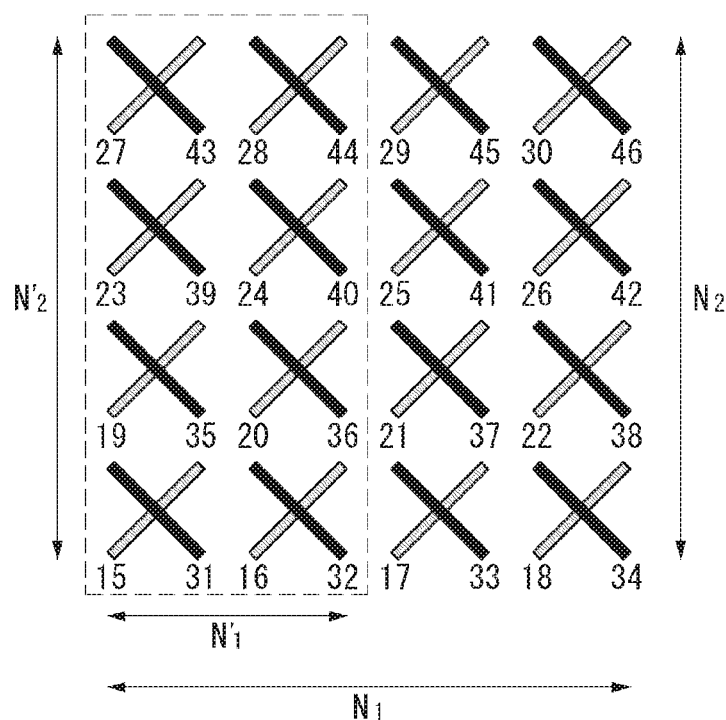
FIG. 21 illustrates a port numbering method for 32 ports through which a CSI-RS is transmitted according to an embodiment of the present invention.

FIG. 21 illustrates a port numbering method for 32 ports used to transmit CSI-RSs according to an embodiment of the present invention. Particularly, FIG. 21 corresponds to an embodiment in which horizontal domain numbering is performed first for 32 ports according to the fourth embodiment.

In FIG. 21, CSI-RS ports included in a rectangle (16 ports) represented by a dotted line are a subset of 32 ports and indicate ports which can be reused along with CSI-RSs of the 32 ports (e.g., two 16-port CSI-RS resources/patterns can be aggregated to form a single 32-port CSI-RS resource/pattern). In other words, the corresponding CSI-RS ports (16 ports) represent antenna ports which can be reused by legacy UEs as well as next-generation UEs for CSI-RS measurement.

Antenna forms defined in Rel. 3 are 1D and 2D and a codebook configuration may depend thereon. In order for legacy UEs to reuse CSI-RSs of 8, 12 and 16 ports defined in Rel. 13 and 18 or more ports to be newly defined, an antenna group form (or antenna (port) layout) to be reused by legacy UEs may be additionally needed. To this end, a base station may additionally signal information about an antenna group form to be reused, for example, N1' and N2', to UEs through RRC signaling.

In the present specification, N1' and N2' denote antenna port size information (or information about an antenna group form/layout/size reused by legacy UEs) additionally set/signaled to UEs. Particularly, N1' denotes the size/number of ports reused by legacy UEs among N1 when the size/number of ports in the horizontal direction is N1 (corresponding to "M" in FIG. 12) and N2' denotes the size/number of ports reused by legacy UEs among N2 when the size/number of ports in the vertical direction is N2 (corresponding to "N" in FIG. 12). In the present specification, information signaled with respect to N1 and N2 may be referred to as "entire layout information" and information signaled with respect to N1' and N2' may be referred to as "partial layout information".

Antenna port size information (e.g., information on N1' and N2') may also be used for dynamic switching of ports in addition to reuse of CSI-RSs. As an example, a UE located at the center of a cell may not be considerably affected by signal attenuation caused by reuse of CSI-RSs because the intensity of a signal from a base station is sufficiently high. Furthermore, on the assumption that the same oversampling factor is used, a codebook size may increase according to the size of a used antenna port, leading to uplink feedback overhead increase.

Accordingly, the base station may additionally RRC-signal partial antenna port size information (N1' and N2') in addition to information on the size of all antenna ports (N1 and N2) to which CSI-RSs are mapped such that UEs can dynamically switch and use a "preferred antenna port-layout indicator (PPI)" (which may also be called a port-layout and CSI-RS resource indicator (PCRI)) through extension to class B of Rel. 13 (when K>1, K being the number of CSI-RS resources/configurations), class B referring to a CSI process type based on a beamformed CSI-RS). Such a PPI may be defined as a specific CSI report type and fed back from a UE to a base station through periodic and/or aperiodic CSI reporting. Furthermore, the PPI may be used in both class A and class B.

For example, reporting of CSI (e.g., RI/PMI/CQI) along with a PPI by a UE may be interpreted as measurement/calculation and reporting of CSI with respect to a specific port layout (e.g., (N1, N2) or (N1', N2')) by the UE in a state in which the specific port layout is assumed. In addition, if CSI is reported through a periodic CSI reporting procedure, a PPI may be reported by being joint-encoded with a PTI and/or a CRI or reported alone, and a UE may perform subsequent CSI reporting on the basis of the reported PPI.

If the above-described embodiments are extended and applied on the basis of Rel. 13 Class A configuration, the embodiments can be applied to a single (16-port or more) CSI-RS resource/pattern. Alternatively, if the above-described embodiments are extended and applied on the basis of Rel. 13 Class B configuration, a plurality of CSI-RS resources/patterns (K>1) can be set such that each CSI-RS resource/pattern corresponds to the aforementioned specific port layout (e.g., (N1(=M), N2(=N)) or (N1', N2')). In view of this, PCRI may be more suitable than PPI.

In addition, the base station may indicate whether to use the entire antenna port size (N1, N2) using an S-bit indicator (e.g., S=1) or to use antenna ports corresponding to a subset of the entire antenna port size or a preset specific antenna layout.

Alternatively, a UE may signal whether to support a function of switching/reporting the aforementioned port numbering methods/port-layout configurations to the base station using capability signaling. For example, the UE may signal, to the base station, antenna port configuration information about an available antenna port set or an unavailable antenna port set in consideration of capability thereof in the form of a bitmap.

Although the above-described embodiments are methods derived on the basis of CDM-2 (or length-2 CDM), they may be extended and applied to cases in which 20-port or more CSI-RS resources/patterns are designed by aggregating 12 ports or 16 ports alone supportable by CDM-4 (or length-4 CD) or other ports including legacy ports.

Figure 22:
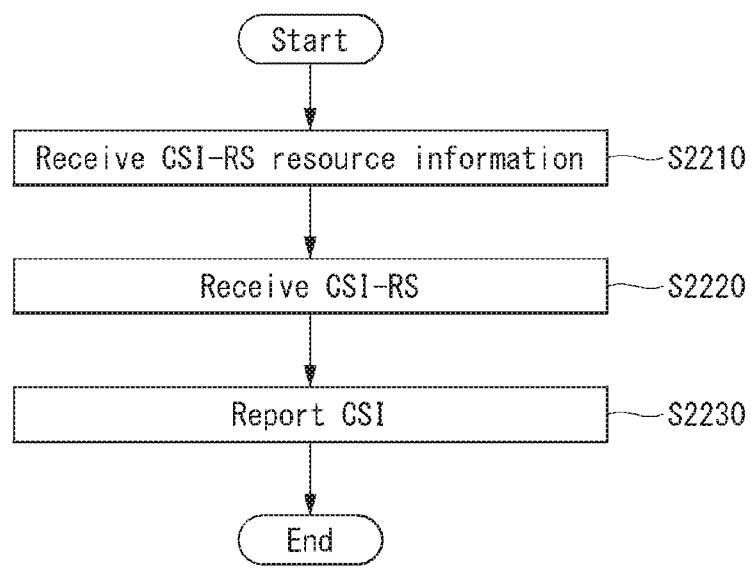
FIG. 22 is a flowchart illustrating a CSI transmission method of a UE according to an embodiment of the present invention.

FIG. 22 is a flowchart illustrating a CSI transmission method according to an embodiment of the present invention. The above-described embodiments may be equally/similarly applied to the method shown in the flowchart, and redundant description will be omitted.

First, a UE may receive CSI-RS resource information on a CSI-RS resource to which a CSI-RS is mapped from a base station (S2210).

Then, the UE may receive the CSI-RS transmitted through one or more antenna ports from the base station on the basis of the received CSI-RS resource information (S2220).

Subsequently, the UE may report CSI generated on the basis of the received CSI-RS to the base station (S2230).

Here, the CSI-RS resource may be configured by aggregating a plurality of legacy CSI-RS resources, and the aggregated legacy CSI-RS resources may be mapped to a plurality of antenna ports having legacy CSI-RS port numbers. Further, the CSI-RS resource may correspond to a non-precoded CSI-RS resource or a plurality of CSI-RS resources of a beamformed CSI-RS type.

In this case, the legacy CSI-RS port numbers may be one-to-one mapped to final CSI-RS port numbers in units of the aggregated legacy CSI-RS resources. The legacy CSI-RS port numbers may be mapped to the final CSI-RS port numbers in ascending order of CSI-RS resource numbers allocated to the aggregated legacy CSI-RS resources. Further, some of the legacy CSI-RS port numbers corresponding to the allocated CSI-RS resource numbers may be mapped to a first group in the final antenna port numbers in ascending order and the remaining legacy CSI-RS port numbers may be mapped to a second group in the final antenna port numbers in ascending order.

Here, the first group may correspond to CSI-RS port numbers allocated to antenna ports having first polarization among the final antenna port numbers and the second group may correspond to CSI-RS port numbers allocated to antenna ports having second polarization different from the first polarization among the final antenna port numbers.

In addition, a CSI-RS transmitted through some of the plurality of antenna ports to which the final antenna port numbers are mapped may be measured by a legacy UE.

Further, a case in which the legacy CSI-RS ports are mapped to the final antenna port numbers in units of the first and second groups may be limited to cases in which the number of antenna ports to which the aggregated legacy CSI-RS resources are mapped is less than the number of antenna ports in the horizontal direction in the antenna layout of the plurality of antenna ports.

Although not shown in the flowchart, the UE may receive information about a method of mapping the final antenna port numbers from the base station.

Further, although not shown in the flowchart, the UE may receive, from the base station, entire layout information on the plurality of antenna ports and partial layout information on specific antenna ports corresponding to a subset of the plurality of antenna ports. Here, the specific antenna ports indicated by the partial layout information may be antenna ports to which a CSI-RS which can be measured by legacy UEs is mapped. In this case, the UE may dynamically switch antenna ports through which a CSI-RS is received to antenna ports indicated by the partial layout information and receive the CSI-RS through the dynamically switched antenna ports in step S2220. To this end, the UE may transmit, to the base station, information about capability thereof which indicates whether dynamic switching of antenna ports through which a CSI-RS is received can be performed.

In addition, when any one piece of preferred layout information is selected between the entire layout information and the partial layout information, the UE may generate CSI on the basis of the CSI-RS transmitted through antenna ports indicated by the selected layout information and report the generated CSI along with the selected layout information to the base station.

Figure 23:
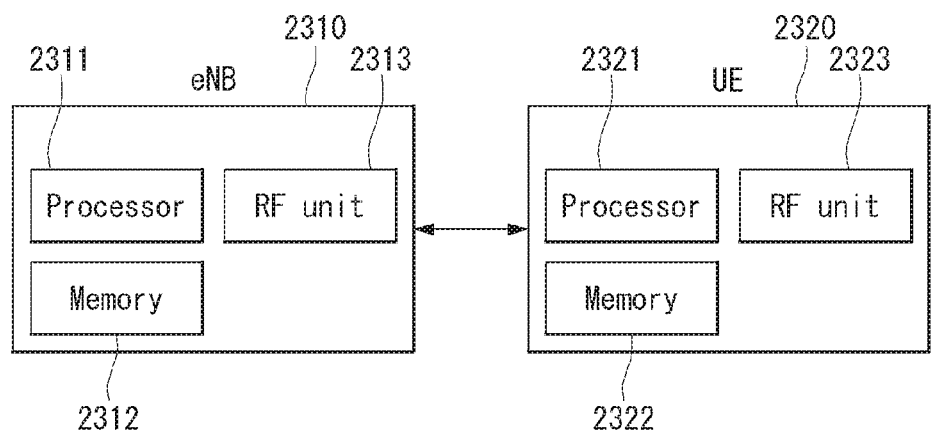
FIG. 23 is a block diagram of wireless communication devices according to an embodiment of the present invention.

General Apparatus to which an Embodiment of the Present Invention May be Applied FIG. 23 illustrates a block diagram of a wireless communication apparatus according to an embodiment of the present invention.

Referring to FIG. 23, the wireless communication system includes an eNB 2310 and a plurality of pieces of UE 2320 located within the area of the eNB 2310.

The eNB 2310 includes a processor 2311, memory 2312, and a radio frequency (RF) unit 2313. The processor 2311 implements the functions, processes and/or methods proposed in FIGS. 1 to 22. The layers of a wireless interface protocol may be implemented by the processor 2311. The memory 2312 is connected to the processor 2311 and stores various pieces of information for driving the processor 2311. The RF unit 2313 is connected to the processor 2311 and transmits and/or receives a radio signal.

The UE 2320 includes a processor 2321, memory 2322, and an RF unit 2323. The processor 2321 implements the functions, processes and/or methods proposed in FIGS. 1 to 22. The layers of a wireless interface protocol may be implemented by the processor 2321. The memory 2322 is connected to the processor 2321 and stores various pieces of information for driving the processor 2321. The RF unit 2323 is connected to the processor 2321 and transmits and/or receives a radio signal.

The memory 2312, 2322 may be inside or outside the processor 2311, 2321 and connected to the processor 2311, 2321 by various well-known means. Furthermore, the eNB 2310 and/or the UE 2320 may have a single antenna or multiple antennas.

In the aforementioned embodiments, the elements and characteristics of the present invention have been combined in specific forms. Each of the elements or characteristics may be considered to be optional unless otherwise described explicitly. Each of the elements or characteristics may be implemented in such a way as to be not combined with other elements or characteristics. Furthermore, some of the elements and/or the characteristics may be combined to form an embodiment of the present invention. The order of the operations described in connection with the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

An embodiment of the present invention may be implemented by various means, for example, hardware, firmware, software or a combination of them. In the case of implementations by hardware, an embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, an embodiment of the present invention may be implemented in the form of a module, procedure, or function for performing the aforementioned functions or operations. Software code may be stored in memory and driven by a processor. The memory may be located inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

MODE FOR INVENTION

Various modes for carrying out the invention have been described in the best mode for carrying the invention.

INDUSTRIAL APPLICABILITY

Although the present invention has been described with reference to examples applied to the 3GPP LTE/LTE-A system, it is applicable to various wireless communication systems other than the 3GPP LTE/LTE-A system.

What is claimed is:

1. A method for reporting channel state information (CSI) of a terminal in a wireless communication system, comprising:
receiving, from a base station, channel state information-reference signal (CSI-RS) resource information on a CSI-RS resource to which a CSI-RS is mapped;
receiving the CSI-RS transmitted through one or more antenna ports from the base station based on the received CSI-RS resource information; and
reporting, to the base station, the CSI generated based on received CSI-RS,
when the CSR-RS resource is configured by aggregating a plurality of legacy CSI-RS resources, and the aggregated legacy CSI-RS resources are mapped to a plurality of antenna ports having legacy CSI-RS port numbers,
wherein the legacy CSI-RS port numbers are one-to-one mapped to final CSI-RS port numbers in units of the aggregated legacy CSI-RS resources, and the legacy CSI-RS port numbers are mapped to the last CSI-RS port numbers in ascending order of the CSI-RS resource numbers allocated for the aggregated legacy CSI-RS resources, and
wherein some of the legacy CSI-RS port numbers corresponding to the allocated CSI-RS resource numbers are mapped to a first group in the final antenna port numbers in ascending order, and the remaining legacy CSI-RS port numbers are mapped to a second group in the final port numbers in ascending order.

2. The method according to claim 1, wherein the first group corresponds to CSI-RS port numbers allocated to antenna ports having first polarization among the final antenna port numbers, and the second group corresponds to CSI-RS port numbers allocated to antenna ports having second polarization different from the first polarization among the final antenna port numbers.

3. The method according to claim 2, wherein the CSI-RS transmitted through some of the plurality of antenna ports to which the final antenna port numbers are mapped is measured by a legacy UE.

4. The method according to claim 3, wherein a case in which the legacy CSI-RS port numbers are mapped to the final antenna port numbers in units of the first and second groups is limited to cases in which the number of antenna ports to which the aggregated legacy CSI-RS resources are mapped is less than the number of antenna ports in the horizontal direction in the antenna layout of the plurality of antenna ports.

5. The method according to claim 1, further comprising:
receiving information about a method of mapping the final antenna port numbers from the base station.

6. The method according to claim 1, further comprising:
receiving, from the base station, entire layout information about the plurality of antenna ports and partial layout information about specific antenna ports corresponding to a subset of the plurality of antenna ports.

7. The method according to claim 6, wherein the specific antenna ports indicated by the partial layout information are antenna ports to which a CSI-RS measurable by legacy UEs is mapped.

8. The method according to claim 6, wherein the receiving of the CSI-RS comprises dynamically switching the antenna ports through which the CSI-RS is received to the antenna ports indicated by the partial layout information and receiving the CSI-RS through the dynamically switched antenna ports.

9. The method according to claim 8, further comprising:
transmitting, to the base station, capability information of the UE indicating whether dynamic switching of the antenna ports through which the CSI-RS is received is available.

10. The method according to claim 6, further comprising:
selecting one piece of preferred layout information between the entire layout information and the partial layout information,
wherein the reporting of the CSI to the base station comprises generating the CSI based on a CSI-RS transmitted through antenna ports indicated by the selected layout information and reporting the CSI along with the selected layout information to the base station.

11. The method according to claim 1, wherein the CSI-RS resource corresponds to a non-precoded CSI-RS resource or a plurality of CSI-RS resources of a beamformed CSI-RS type.

12. A UE transmitting channel state information (CSI) in a wireless communication system, the UE comprising:
a radio frequency (RF) unit for transmitting and receiving radio signals; and
a processor for controlling the RF unit,
wherein the processor is configured to,
receive, from a base station, CSI-RS resource information on a CSI-RS resource to which a CSI-RS is mapped,
receive the CSI-RS transmitted through one or more antenna ports from the base station based on the received CSI-RS resource information, and
report, to the base station, the CSI generated based on the received CSI-RS,
when the CSR-RS resource is configured by aggregating a plurality of legacy CSI-RS resources, and the aggregated legacy CSI-RS resources are mapped to a plurality of antenna ports having legacy CSI-RS port numbers,
wherein the legacy CSI-RS port numbers are one-to-one mapped to final CSI-RS port numbers in units of the aggregated legacy CSI-RS resources, and the legacy CSI-RS port numbers are mapped to the last CSI-RS port numbers in ascending order of the CSI-RS resource numbers allocated for the aggregated legacy CSI-RS resources, and
wherein some of the legacy CSI-RS port numbers corresponding to the allocated CSI-RS resource numbers are mapped to a first group in the final antenna port numbers in ascending order, and the remaining legacy CSI-RS port numbers are mapped to a second group in the final port numbers in ascending order.

13. The UE according to claim 12, wherein the first group corresponds to CSI-RS port numbers allocated to antenna ports having first polarization among the final antenna port numbers, and the second group corresponds to CSI-RS port numbers allocated to antenna ports having second polarization different from the first polarization among the final antenna port numbers.

14. The UE according to claim 13, wherein the CSI-RS transmitted through some of the plurality of antenna ports to which the final antenna port numbers are mapped is measured by a legacy UE.

15. The UE according to claim 14, wherein a case in which the legacy CSI-RS port numbers are mapped to the final antenna port numbers in units of the first and second groups is limited to cases in which the number of antenna ports to which the aggregated legacy CSI-RS resources are mapped is less than the number of antenna ports in the horizontal direction in the antenna layout of the plurality of antenna ports.

* * * * *